US009838479B2

(12) United States Patent
Briere et al.

(10) Patent No.: US 9,838,479 B2
(45) Date of Patent: Dec. 5, 2017

(54) METHOD AND APPARATUS FOR COLLECTING AND DISSEMINATING INFORMATION OVER A COMPUTER NETWORK

(71) Applicant: mBLAST, Inc., New York, NY (US)

(72) Inventors: Daniel D. Briere, Mansfield Center, CT (US); Paul W. Pritchard, Southlake, TX (US)

(73) Assignee: MBLAST, INC., Cambridge, MA (US)

( * ) Notice: Subject to any disclaimer, the term of this patent is extended or adjusted under 35 U.S.C. 154(b) by 0 days.

(21) Appl. No.: 15/581,533

(22) Filed: Apr. 28, 2017

(65) Prior Publication Data

US 2017/0230460 A1    Aug. 10, 2017

Related U.S. Application Data

(60) Division of application No. 15/342,730, filed on Nov. 3, 2016, which is a continuation of application No.
(Continued)

(51) Int. Cl.
*H04L 29/06*    (2006.01)
*H04L 29/08*    (2006.01)
(Continued)

(52) U.S. Cl.
CPC .... *H04L 67/1097* (2013.01); *G06F 17/30377* (2013.01); *G06F 17/30876* (2013.01);
(Continued)

(58) Field of Classification Search
CPC ......... H04L 29/06306; H04L 29/06836; H04L 29/08972; H04L 63/102
See application file for complete search history.

(56) References Cited

U.S. PATENT DOCUMENTS 4,816,904 A    3/1989    McKenna et al.
5,371,673 A    12/1994    Fan
(Continued)

FOREIGN PATENT DOCUMENTS

JP    08-044718    2/1996
JP    2003-48056    4/2005
(Continued)

OTHER PUBLICATIONS

Office Action for U.S. Appl. No. 15/342,730, dated Apr. 19, 2017.
(Continued)

*Primary Examiner* — Arvin Eskandarnia

(57) ABSTRACT

The apparatus comprises at least one database for storing digital information associated with at least a first user and a second user, at least one links module for the first user and for the second user, at least one manipulations module and at least one display device for respectively displaying at least said linked digital information wherein said linked digital information associated with said first user is automatically updated on at least said display device of said second user when that information is manipulated, and wherein said linked digital information associated with said second user is automatically updated on at least said display device of said first user when that information is manipulated.

24 Claims, 7 Drawing Sheets

Related U.S. Application Data

15/195,052, filed on Jun. 28, 2016, now Pat. No. 9,519,911, which is a continuation of application No. 14/986,817, filed on Jan. 4, 2016, now Pat. No. 9,396,479, which is a continuation of application No. 14/974,653, filed on Dec. 18, 2015, now Pat. No. 9,386,124, which is a continuation of application No. 14/719,082, filed on May 21, 2015, now Pat. No. 9,251,265, which is a continuation of application No. 14/486,630, filed on Sep. 15, 2014, now Pat. No. 9,047,484, which is a continuation of application No. 14/033,099, filed on Sep. 20, 2013, now Pat. No. 9,047,483, which is a division of application No. 13/341,121, filed on Dec. 30, 2011, now Pat. No. 8,571,173, which is a continuation of application No. 13/067,262, filed on May 19, 2011, now Pat. No. 8,117,261, which is a division of application No. 12/292,898, filed on Nov. 28, 2008, now Pat. No. 7,966,369, which is a continuation-in-part of application No. 10/875,796, filed on Jun. 25, 2004, now abandoned, which is a continuation-in-part of application No. 09/948,050, filed on Sep. 7, 2001, now abandoned, said application No. 14/719,082 is a continuation of application No. 14/033,099, filed on Sep. 20, 2013, now Pat. No. 9,047,483, which is a continuation of application No. 13/341,121, filed on Dec. 30, 2011, now Pat. No. 8,572,173, which is a continuation of application No. 13/067,262, filed on May 19, 2011, now Pat. No. 8,117,261, which is a division of application No. 12/292,898, filed on Nov. 28, 2008, now Pat. No. 7,966,369, which is a continuation-in-part of application No. 10/875,796, filed on Jun. 25, 2004, now abandoned, which is a continuation-in-part of application No. 09/948,050, filed on Sep. 7, 2000, now abandoned.

(60) Provisional application No. 60/230,799, filed on Sep. 7, 2000.

(51) Int. Cl.
*G06F 17/30* (2006.01)
*G06Q 30/02* (2012.01)

(52) U.S. Cl.
CPC ........ *G06F 17/30896* (2013.01); *H04L 67/02* (2013.01); *H04L 67/16* (2013.01); *H04L 67/306* (2013.01); *G06Q 30/0201* (2013.01)

(56) References Cited

U.S. PATENT DOCUMENTS

| | | | |
|---|---|---|---|
| 5,418,951 A | 5/1995 | Damashek | |
| 5,428,778 A | 6/1995 | Brookes | |
| 5,490,060 A | 2/1996 | Malec et al. | |
| 5,528,490 A | 6/1996 | Hill | |
| 5,555,426 A | 9/1996 | Johnson et al. | |
| 5,572,643 A | 11/1996 | Judson | |
| 5,729,735 A | 3/1998 | Meyering | |
| 5,761,662 A | 6/1998 | Dasan | |
| 5,809,481 A | 9/1998 | Baron et al. | |
| 5,862,325 A | 1/1999 | Reed et al. | |
| 5,864,863 A | 1/1999 | Burrows | |
| 5,870,552 A | 2/1999 | Dozier et al. | |
| 5,930,764 A | 7/1999 | Melchione et al. | |
| 5,930,765 A | 7/1999 | Martin | |
| 5,956,693 A | 9/1999 | Geerlings | |
| 5,966,695 A | 10/1999 | Melchione et al. | |
| 5,974,412 A | 10/1999 | Hazlehurst | |
| 5,983,214 A | 11/1999 | Lang et al. | |
| 6,009,407 A | 12/1999 | Garg | |
| 6,029,161 A | 2/2000 | Lang et al. | |
| 6,029,195 A | 2/2000 | Herz | |
| 6,078,892 A | 6/2000 | Anderson et al. | |
| 6,078,924 A | 6/2000 | Ainsbury et al. | |
| 6,098,065 A | 8/2000 | Skillen et al. | |
| 6,108,645 A | 8/2000 | Eichstaedt et al. | |
| 6,119,101 A | 9/2000 | Peckover | |
| 6,134,532 A | 10/2000 | Lazarus et al. | |
| 6,151,584 A | 11/2000 | Papierniak et al. | |
| 6,151,601 A | 11/2000 | Papierniak et al. | |
| 6,199,077 B1 | 3/2001 | Inala et al. | |
| 6,202,058 B1 | 3/2001 | Rose et al. | |
| 6,205,478 B1 | 3/2001 | Sugano et al. | |
| 6,209,029 B1 * | 3/2001 | Epstein | G06F 17/30893 707/E17.117 |
| 6,212,530 B1 | 4/2001 | Kadlec | |
| 6,226,650 B1 | 5/2001 | Mahajan et al. | |
| 6,236,975 B1 | 5/2001 | Boe et al. | |
| 6,240,412 B1 | 5/2001 | Dyko et al. | |
| 6,249,282 B1 | 6/2001 | Sutcliffe et al. | |
| 6,263,335 B1 | 7/2001 | Paik et al. | |
| 6,269,369 B1 | 7/2001 | Robertson | |
| 6,292,783 B1 | 9/2001 | Rohler et al. | |
| 6,292,786 B1 | 9/2001 | Deaton et al. | |
| 6,326,988 B1 | 12/2001 | Gould et al. | |
| 6,336,133 B1 | 1/2002 | Morris et al. | |
| 6,338,067 B1 | 1/2002 | Baker et al. | |
| 6,349,302 B1 * | 2/2002 | Aoyama | G06F 17/30011 |
| 6,421,675 B1 | 7/2002 | Ryan et al. | |
| 6,424,951 B1 | 7/2002 | Shurling et al. | |
| 6,453,352 B1 | 9/2002 | Wagner et al. | |
| 6,487,541 B1 | 11/2002 | Aggarwal et al. | |
| 6,502,039 B1 | 12/2002 | Theilhaber et al. | |
| 6,502,093 B1 | 12/2002 | Bhatt et al. | |
| 6,507,841 B2 | 1/2003 | Riverieulx de Varax | |
| 6,507,908 B1 | 1/2003 | Caronni | |
| 6,515,681 B1 | 2/2003 | Knight | |
| 6,519,629 B2 | 2/2003 | Harvey et al. | |
| 6,523,044 B1 | 2/2003 | Muramoto et al. | |
| 6,530,082 B1 | 3/2003 | Del Sesto et al. | |
| 6,539,376 B1 | 3/2003 | Sundaresan et al. | |
| 6,546,393 B1 | 4/2003 | Khan | |
| 6,560,600 B1 | 5/2003 | Broder | |
| 6,577,634 B1 | 6/2003 | Tsukakoshi et al. | |
| 6,578,025 B1 | 6/2003 | Pollack et al. | |
| 6,687,741 B1 * | 2/2004 | Ramaley | G06Q 10/107 709/206 |
| 6,697,800 B1 | 2/2004 | Jannink et al. | |
| 6,721,748 B1 | 4/2004 | Knight et al. | |
| 6,735,593 B1 | 5/2004 | Williams | |
| 6,807,566 B1 | 10/2004 | Bates et al. | |
| 6,820,204 B1 * | 11/2004 | Desai | G06F 21/6245 705/51 |
| 6,826,574 B1 | 11/2004 | Colbath | |
| 6,826,594 B1 | 11/2004 | Pettersen | |
| 6,839,701 B1 | 1/2005 | Baer et al. | |
| 6,845,374 B1 | 1/2005 | Oliver et al. | |
| 6,859,807 B1 | 2/2005 | Knight et al. | |
| 6,901,380 B1 | 5/2005 | Bremers | |
| 6,963,850 B1 | 11/2005 | Bezos et al. | |
| 6,988,138 B1 * | 1/2006 | Alcorn | G09B 7/02 434/350 |
| 7,000,194 B1 | 2/2006 | Newbold | |
| 7,062,561 B1 | 6/2006 | Reisman | |
| 7,080,139 B1 | 7/2006 | Briggs et al. | |
| 7,082,418 B2 | 7/2006 | Levy et al. | |
| 7,107,226 B1 | 9/2006 | Cassidy et al. | |
| 7,130,853 B2 | 10/2006 | Roller et al. | |
| 7,143,089 B2 | 11/2006 | Petras et al. | |
| 7,159,011 B1 | 1/2007 | Knight et al. | |
| 7,302,429 B1 | 11/2007 | Wanker | |
| 7,353,246 B1 | 4/2008 | Rosen et al. | |
| 7,376,613 B1 | 5/2008 | Cofino et al. | |
| 7,379,880 B1 | 5/2008 | Pathria et al. | |
| 7,685,224 B2 | 3/2010 | Nye | |
| 7,725,525 B2 | 5/2010 | Work | |
| 7,957,991 B2 * | 6/2011 | Mikurak | G06Q 10/06 705/7.11 |

(56) References Cited

U.S. PATENT DOCUMENTS

| | | | |
|---|---|---|---|
| 7,966,369 | B1 | 6/2011 | Briere et al. |
| 8,032,409 | B1* | 10/2011 | Mikurak ............... G06Q 10/00 705/14.39 |
| 8,117,261 | B2 | 2/2012 | Briere et al. |
| 8,121,891 | B2 | 2/2012 | Handel et al. |
| 8,572,173 | B2 | 10/2013 | Briere et al. |
| 9,047,484 | B2 | 6/2015 | Briere et al. |
| 9,251,265 | B2 | 2/2016 | Briere et al. |
| 2001/0032115 | A1 | 10/2001 | Goldstein |
| 2002/0002987 | A1 | 1/2002 | Jones et al. |
| 2002/0022987 | A1 | 2/2002 | Mahmood et al. |
| 2002/0029870 | A1 | 3/2002 | Schweinichen |
| 2002/0056003 | A1 | 5/2002 | Goswami |
| 2002/0073079 | A1 | 6/2002 | Terheggen |
| 2002/0078045 | A1 | 6/2002 | Dutta |
| 2002/0095454 | A1 | 7/2002 | Reed et al. |
| 2002/0103737 | A1 | 8/2002 | Briere |
| 2002/0111847 | A1 | 8/2002 | Smith |
| 2002/0174010 | A1 | 11/2002 | Rice |
| 2003/0097361 | A1* | 5/2003 | Huang ............... G06F 17/30861 |
| 2004/0172415 | A1 | 9/2004 | Messina et al. |
| 2005/0114470 | A1 | 5/2005 | Bal |
| 2006/0031114 | A1 | 2/2006 | Zommers |
| 2006/0074727 | A1* | 4/2006 | Briere ............... G06Q 10/0631 705/7.12 |
| 2010/0070485 | A1* | 3/2010 | Parsons ............ G06F 17/30864 707/709 |
| 2010/0205220 | A1* | 8/2010 | Hart ................. G06F 17/30958 707/797 |
| 2011/0314101 | A1* | 12/2011 | Redmon ............... G06Q 10/10 709/204 |
| 2013/0185643 | A1 | 7/2013 | Greifeneder et al. |
| 2014/0019204 | A1 | 1/2014 | Briere et al. |
| 2016/0103896 | A1 | 4/2016 | Briere et al. |
| 2016/0105533 | A1 | 4/2016 | Briere et al. |
| 2016/0117697 | A1 | 4/2016 | Briere et al. |

FOREIGN PATENT DOCUMENTS

| | | |
|---|---|---|
| WO | WO 00/02112 | 1/2000 |
| WO | WO 02/19790 | 3/2002 |
| WO | WO 02/37378 | 5/2002 |

OTHER PUBLICATIONS

International Search Report for International Application No. PCT/US2001/027721, dated Aug. 29, 2002.
International Preliminary Examination Report for International Application No. PCT/US2001/027721, dated Apr. 28, 2004.
Microsoft Access User's Guide, Microsoft Corporation, 1994, pp. 43-46-59-63, 67, 69, 99-102, 104-108 and 339.
Epinions.com and Excite@Home Launch Product Review Service. PR Newswire. Dec. 20, 1999.
Hall, D. et al., Build a Web Site (published by Net.Genesis). ISBN: 0-7615-0064-2. 1995. pp. 10-17, 54, 55, 140-145, 265-272, 361-363, 427, 428.
Marketing Information chain (online) (retrieved on Jul. 7, 2001) (Retrieved from URL<http://web.archive.org/web/20010707163440/http://www.mblast.com/home/marketinginformationchain.asp]>.
Solutions [online] (retrieved on Jul. 7, 2001] (retrieved from URL<http://web.archive.org/web/20010707163443/http://www.mblast.com/home/solutions.asp].
Company [online] (retrieved on Jul. 7, 2001) (retrieved from http://web.archive.org/web/20010707163353/http://www.mblast.com/home/company.asp).
Blair, Time to get Pushy!, Information and Research Centre, 1998.
Cheng, A Publish/Subscribe Framework: Push Technology in Electronic Commerce, Springer, 1999.
Juvva et al., The Real-Time Push-Pull Communications Model for Distributed Real-Time and Multimedia Systems, The Robotic Institute, 1999.
Lewin, An Introduction to RSS news feeds using open formats for content syndication, IBM: developerWorks: Web architecture library, XML library, 2000.
Kumar et al., A SHAREd Web to support design teams, IEEE, 1994.
Nardi et al., Interaction and Outeraction: Instant Messaging in Action, CSCW, 2000.
Walther, Supporting Development of Synchronous Collaboration Tools on the Web with GroCo, Proceedings of the ERCIM workshop on CSCW and the Web, Feb. 1996.
Cohen, Quilt: a collaborative tool for cooperative writing, ACM 1988.
Roseman et al., TeamRooms: Network Places for Collaboration, ACM 1996.
Arant et al., Library Outreach, Partnerships, and distance eduction, Reference Libararians at the Gateway, Real-Time Reference Service for the Remote User: From the Telephone and Electronic mail to Internet Chat, Instant Messaging and Collaborative Software, pp. 29-40—2000.
Alton-Scheidl et al., Select: Social and Collaborative Fileltering of Web Documents and News. The Select Project Team [Online] 1999.
Asasu et al., Searching the Web. ACM Transactions on Internet Technology [Online] Aug. 2001, vol. 1, Issue 1, pp. 2-43.
Chiasson et al., Factors influencing the formation of a user's perceptions and use of a DSS software innovation. Database for Advances in Information Systems [Online] 2001.
Hyziak et al., Real-time measurement of Web Content Access performance. Motorola [Online] Apr. 2001.
Lam et al., Modeling User Interest Shift Using a Bayesian Approach. Journal of the American Society for Information Science and Technology [Online] Mar. 2001, vol. 52, Issue 5, pp. 416-429.
Okleshen et al., "Usenet Groups, Virtual Community and Consumer Behaviors," [Online] <http://acrwebsite.org/volumes/8170/volumes/v25/NA-25, 1998>, Advances in Consumer Research, vol. 25, 1998, pp. 276-282.
Gunawardena et al., "Analysis of a Global Online Debate and the Development of an Interaction Analysis Model for Examining Social Construction of Knowledge in Computer Conferencing," [Online] http://jec.sagepub.com/content/17/4/397.abstract, 1997>, J. Educational Computing Research, vol. 17(4), pp. 397-431.
PR Newswire, "eWonders.com, Inc. Launches All-Inclusive E-Shopping Guide to Help Consumers Find the Right Product at the Right Price from the Right Place," Dec. 7, 1999 (2 pgs.).
PR Newswire, "Snap.com and XOOM.com Launch 'Snap Shopping,' a One-Stop Place to Find Products, Compare Prices and Buy Virtually Anything on the Web this Holiday," Nov. 15, 1999 (4 pgs.).
PR Newswire, "Taxi Interactive Announces the First Internet Shopping Applications For Consumers," Oct. 14, 1998 (3 pgs.).
PR Newswire, "zoomit.com Goes for Top Spot in Online Shopping Through Acquisition of Product Information Service," Sep. 5, 2000 (3 pgs.).
PR Newswire, "pcOrder Announces ContentSource 2.0; Broader Content, New Applications Enable Educated Buying Services on the Web," Dec. 8, 1999 (3 pgs.).
PR Newswire, "Excite@Home Launches New Shopping Service for Holiday Shoppers," Nov. 15, 1999 (4 pgs.).
Bakos et al. "The emerging role of electronic marketplaces on the Internet," Communications of the ACM, vol. 41, No. 8, Aug. 1998 (8 pgs.).
Business Wire, "Cybershop.com Targets Shopping Bots to Drive More Traffic," Dec. 1, 1999 (3 pgs.).
Pivk et al. "Intelligent Agents in E-commerce," Electrotechnical Review 67.5 (2000): 251-260.

* cited by examiner

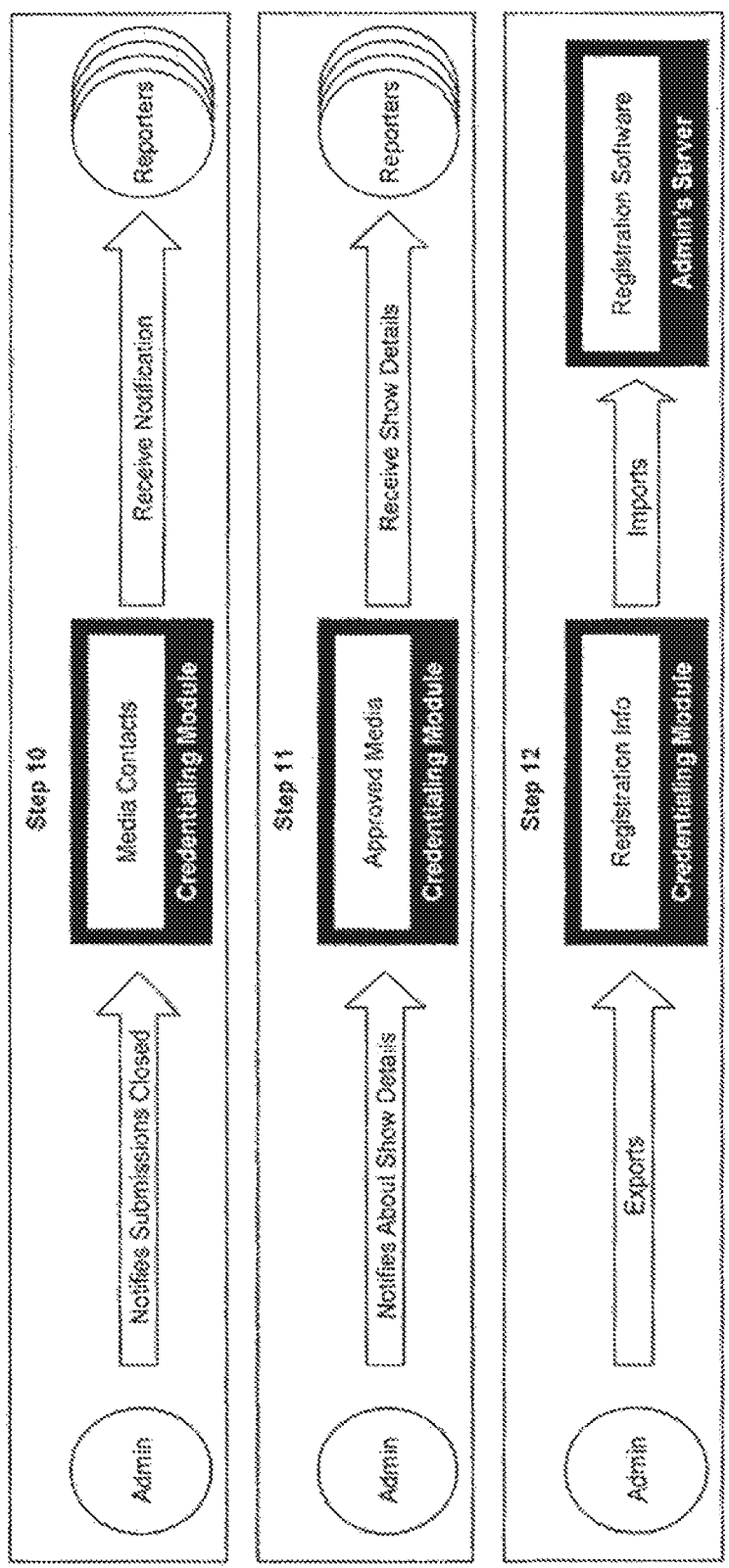

METHOD AND APPARATUS FOR COLLECTING AND DISSEMINATING INFORMATION OVER A COMPUTER NETWORK

CROSS-REFERENCE TO RELATED APPLICATIONS

The present application is a divisional of U.S. patent application Ser. No. 15/342,730, filed Nov. 3, 2016 entitled "Method and Apparatus for Collecting and Disseminating Information over a Computer Network," which is a continuation of U.S. patent application Ser. No. 15/195,052, filed Jun. 28, 2016, now U.S. Pat. No. 9,519,911, entitled "Method and Apparatus for Collecting and Disseminating Information over a Computer Network," which is a continuation of U.S. patent application Ser. No. 14/986,817, filed Jan. 4, 2016, now U.S. Pat. No. 9,396,479, entitled "Method and Apparatus for Collecting and Disseminating Information over a Computer Network," which is a continuation of U.S. patent application Ser. No. 14/974,653, filed Dec. 18, 2015, now U.S. Pat. No. 9,386,124, entitled "Method and Apparatus for Collecting and Disseminating Information over a Computer Network," which is a continuation of U.S. patent application Ser. No. 14/719,082, filed May 21, 2015, now U.S. Pat. No. 9,251,265, entitled "Method and Apparatus for Collecting and Disseminating Information over a Computer Network," which is a continuation of U.S. patent application Ser. No. 14/486,630, filed Sep. 15, 2014, now U.S. Pat. No. 9,047,484, entitled "Method and Apparatus for Collecting and Disseminating Information over a Computer Network," which is a continuation of U.S. patent application Ser. No. 14/033,099, filed Sep. 20, 2013, now U.S. Pat. No. 9,047,483, entitled "Method and Apparatus for Collecting and Disseminating Information over a Computer Network," which is a continuation of U.S. patent application Ser. No. 13/341,121, filed Dec. 30, 2011, now U.S. Pat. No. 8,572,173, entitled "Method and Apparatus for Collecting and Disseminating Information over a Computer Network," which is a continuation of U.S. patent application Ser. No. 13/067,262, filed May 19, 2011, now U.S. Pat. No. 8,117,261, entitled "Method and Apparatus for Collecting and Disseminating Information over a Computer Network," which is a divisional of U.S. patent application Ser. No. 12/292,898, filed Nov. 28, 2008, now U.S. Pat. No. 7,966,369, entitled "Method and Apparatus for Collecting and Disseminating Information over a Computer Network," which is a continuation-in-part of now-abandoned U.S. patent application Ser. No. 10/875,796, filed Jun. 25, 2004, entitled "Method and Apparatus for Collecting and Disseminating Information over a Computer Network," which is a continuation-in-part of now-abandoned U.S. patent application Ser. No. 09/948,050, filed Sep. 7, 2001, entitled "Marketing Collateral Repository and Supporting Data Management and Communication Environment," which claims priority to U.S. Provisional Patent Application No. 60/230,799, filed Sep. 7, 2000, entitled "Marketing Collateral Repository and Supporting Data Management and Communication Environment," the disclosures of which are incorporated herein by reference in their entireties.

U.S. patent application Ser. No. 14/719,082, filed May 21, 2015, now U.S. Pat. No. 9,251,265, is also a continuation of U.S. patent application Ser. No. 14/033,099, filed Sep. 20, 2013, now U.S. Pat. No. 9,047,483, entitled "Method and Apparatus for Collecting and Disseminating Information over a Computer Network," which is a continuation of U.S. patent application Ser. No. 13/341,121, filed Dec. 30, 2011, now U.S. Pat. No. 8,572,173, entitled "Method and Apparatus for Collecting and Disseminating Information over a Computer Network," which is a continuation of U.S. patent application Ser. No. 13/067,262, filed May 19, 2011, now U.S. Pat. No. 8,117,261, entitled "Method and Apparatus for Collecting and Disseminating Information over a Computer Network," which is a divisional of U.S. patent application Ser. No. 12/292,898, filed Nov. 28, 2008, now U.S. Pat. No. 7,966,369, entitled "Method and Apparatus for Collecting and Disseminating Information over a Computer Network," which is a continuation-in-part of now-abandoned U.S. patent application Ser. No. 10/875,796, filed Jun. 25, 2004, entitled "Method and Apparatus for Collecting and Disseminating Information over a Computer Network," which is a continuation-in-part of now-abandoned U.S. patent application Ser. No. 09/948,050, filed Sep. 7, 2001, entitled "Marketing Collateral Repository and Supporting Data Management and Communication Environment," which claims priority to U.S. Provisional Patent Application No. 60/230,799, filed Sep. 7, 2000, entitled "Marketing Collateral Repository and Supporting Data Management and Communication Environment," the disclosures of which are incorporated herein by reference in their entireties.

FIELD OF INVENTION

The present invention generally relates to the field of information technology. More particularly, the present invention relates to a method and apparatus for collecting and disseminating information in an organized and systematic manner using one or more computer networks.

BACKGROUND OF THE INVENTION

In today's information driven world, ready access to reliable and timely information is extremely important. The emergence of computer networks and their widespread use as information highways has made searching for, and delivery of, information much easier than in times past. The widespread use of e-mail for sending and receiving information over the Internet is evidence of the importance of the Internet as an information highway.

Most users of the Internet use the World Wide Web (hereinafter referred to as the "web") to retrieve web pages that are hosted by particular servers on the Internet using Internet Protocol (IP) addresses and domain naming conventions that are well known in the art. The popularity of the web and rapid advances in server technology and software, such as INTERNET EXPLORER and FIREFOX brand web browsers, have resulted in many applications being provided on Internet-based servers as enterprise solutions for use by a great number of people rather than on a stand-alone computer for use only by individual users. More importantly, information providers and information consumers are much more computer savvy today than in the past and often look to the Internet as a solution of choice for their information collection and dissemination needs.

Consumers of goods and services (hereinafter referred to as "Buyers") often rely on the Internet as an information resource to guide their purchase decisions at some point during the selection process. Increasingly, Buyers, especially more sophisticated Buyers, are turning to trusted advisors (referred to hereinafter as "Influencers") to guide their purchase decisions. Influencers come in many forms, including the following:

1. People: Reporters, Editors, Financial Analysts, Industry Analysts, Associations/Forums, Regulatory Bodies, etc.;

2. Web-Based Media: Online Vertical Sites and Buyer's Guides covering a specific industry or a broad spectrum of technology-based products, Directories, Links Pages, FAQs, Comparative Websites, and Search Engines; and 3. Other Media: Print Publications, such as magazines and newspapers, Radio, and TV Shows, such as MSNBC, CNET TV, etc.

Influencers fill a critical role in helping consumers to better understand product requirements and features and to move more quickly to a purchase decision. Influencers are the gatekeepers through which the sellers of goods and services (referred to hereinafter as "Sellers") reach Buyers—whether buying optical telecommunications switching equipment or cleaning fluids for contract office cleaners. Influencers are the indirect channels that influence the Buyers. Sellers must, therefore, establish strong relationships with the many Influencers who have influence over their respective Buyers to successfully guide those Buyers to purchase the Seller's products and services.

Among the specific Influencer information that a buyer may utilize in making purchase decision is information provided in the following forms:

4. Web Content Publishers: Vertical Websites/Portals, Comparison Sites, Search Engines, Discussion Groups, FAQs, and Links Pages;

5. Print Publications: Buyer's Guides and Directories;

6. Analysts: Industry Analyst and Financial Analyst Reports;

7. Industry Associations/Forums/Regulatory Bodies: Industry Standards/Trends, Membership Directories, Members Listed by Product/Services Categorizations, and Industry Statistics; and 8. Other Media: Radio/Web Broadcasts and TV/Web Broadcasts. Buyers making purchasing decisions, however, are not the only parties that rely on such forms of information. Sellers and Influencers also must rely on those forms of information.

For example, those within a particular industry who are tasked with following and/or reporting on industry developments, such as reporters or analysts, i.e., Influencers, must have ready and rapid access to industry news and trends. And, those within a particular industry who are tasked with keeping industry followers informed, such as company sales and marketing departments, i.e., Sellers, are equally motivated to get their message out. The resulting challenge is that of achieving the objectives of Influencers, Buyers, and Sellers as efficiently and effectively as possible.

Although the Internet's phenomenal success has brought a wealth of options to users' computer screens, allowing users to research and locate products and services that best fit the users' needs and wants, so many options now exist that searching for information on the Internet can easily become a daunting task because relevant information often is difficult to find, conflicting, incomplete, or simply missing. The novice user can easily become overwhelmed trying to discern who has what information and how the information may best be obtained. Accordingly, the Internet does not always allow those having information to share with a reliable method of reaching their intended audience.

Accordingly, there is a great need in the art for a method and apparatus for collecting and disseminating information in an organized and systematic manner for information providers and information consumers. This need in the art extends to work flow and coordination paths for the execution and processing of legal documents, i.e., nondisclosure agreements, multi-party leases, rental and sales contracts and the like; arranging of meetings and appointments; coordinating contests and product reviews; and all other activities involving two or more parties where the rapid and reliable flow of information between parties is important.

SUMMARY OF THE INVENTION

Accordingly, to solve at least the above problems and/or disadvantages and to provide at least the advantages described below, a non-limiting object of the present invention is to provide a device of and method for device of and method for collecting and disseminating information over at least one computer network, the apparatus comprising at least one database for storing digital information associated with at least a first user and a second user, at least one links module for the first user to link to at least a portion of said digital information associated with said second user and for the second user to link to at least a portion of said digital information associated with said first user, at least one manipulations module for manipulating said digital information stored in said at least one database, and at least one display device associated with each of the at least first user and second user for respectively displaying at least said linked digital information to each of said at least first user and second user, wherein said linked digital information associated with said first user is automatically updated on at least said display device of said second user when that information is manipulated, and wherein said linked digital information associated with said second user is automatically updated on at least said display device of said first user when that information is manipulated.

These and other objects of the invention, as well as many of the intended advantages thereof, will become more readily apparent when reference is made to the following description, taken in conjunction with the accompanying drawings.

BRIEF DESCRIPTION OF THE DRAWINGS

FIGS. 5A-5C are flow charts illustrating a non-limiting embodiment of a workflow process employed by a Media Credentialing Module of the present invention; and Attention is also called to the Computer Program Listing Appendix that is incorporated by reference.

DETAILED DESCRIPTION OF THE INVENTION

Figure 1:
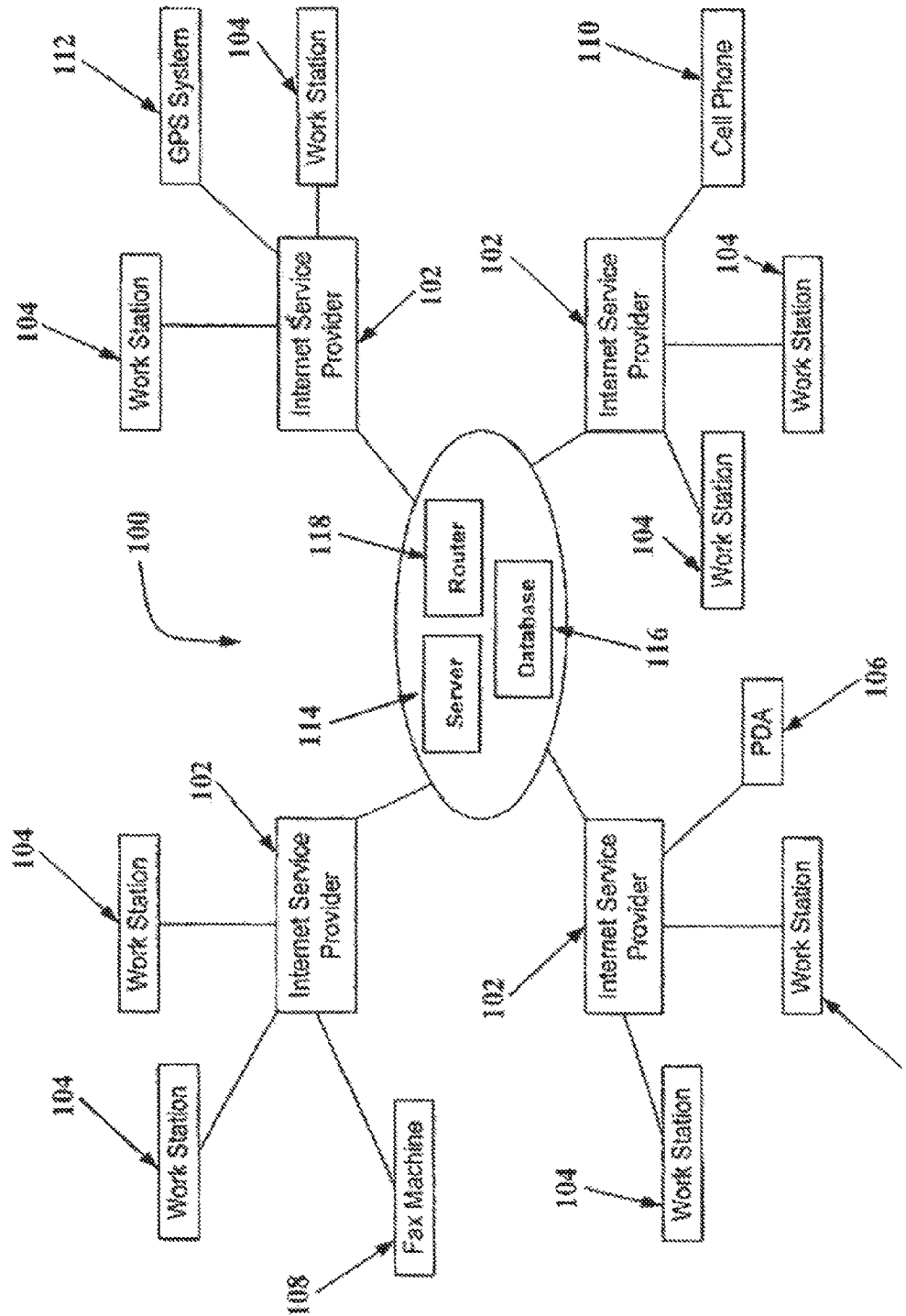
FIG. 1 is a block diagram illustrating a non-limiting exemplary embodiment of a network structure utilized to implement the functionalities of the present invention.

Reference will now be made in detail to non-limiting embodiments of the present invention by way of reference to the accompanying drawings, wherein like reference numerals refer to like parts, components and structures.

Turning to the figures, FIG. 1 is a block diagram illustrating a computer Network 100 that can be used as the means to implement the present invention over the Internet. The Network 100 illustrated in FIG. 1 is generally represented by a network cloud with a plurality of connected Internet Service Providers (ISPs) 102. Each ISP 102 serves as the entry point for users of the Internet. Connected to the ISPs 102, the Network 100 includes Computer Work Stations 104, Personal Digital Assistants (PDAs) 106, Facsimile Machines 108, Cellular Telephones 110, and GPS Systems 112 for sending and receiving information across the Internet. Internet users may also use any one of numerous other devices to send and receive information across the Internet.

Central to the Network 100 of the present invention is at least one Server 114, at least one Database 116, and at least one Router 118 that are responsible for collecting, storing, and disseminating information across the Network 100 to the various users. The Server(s) 114 executes the applications, or routines, of the present invention and control the various functionality of the present invention. The Database(s) 116 stores digital information, or data, in a structured manner for modification and retrieval by the Server(s) 114 and Router(s) 118. The Router(s) 118 carries out the various functionality of the present invention by performing switching and routing functions that direct user commands to the Server(s) 114 and cause information to flow between users across the Network 100 in accordance with the routines of the present invention.

Figure 2:
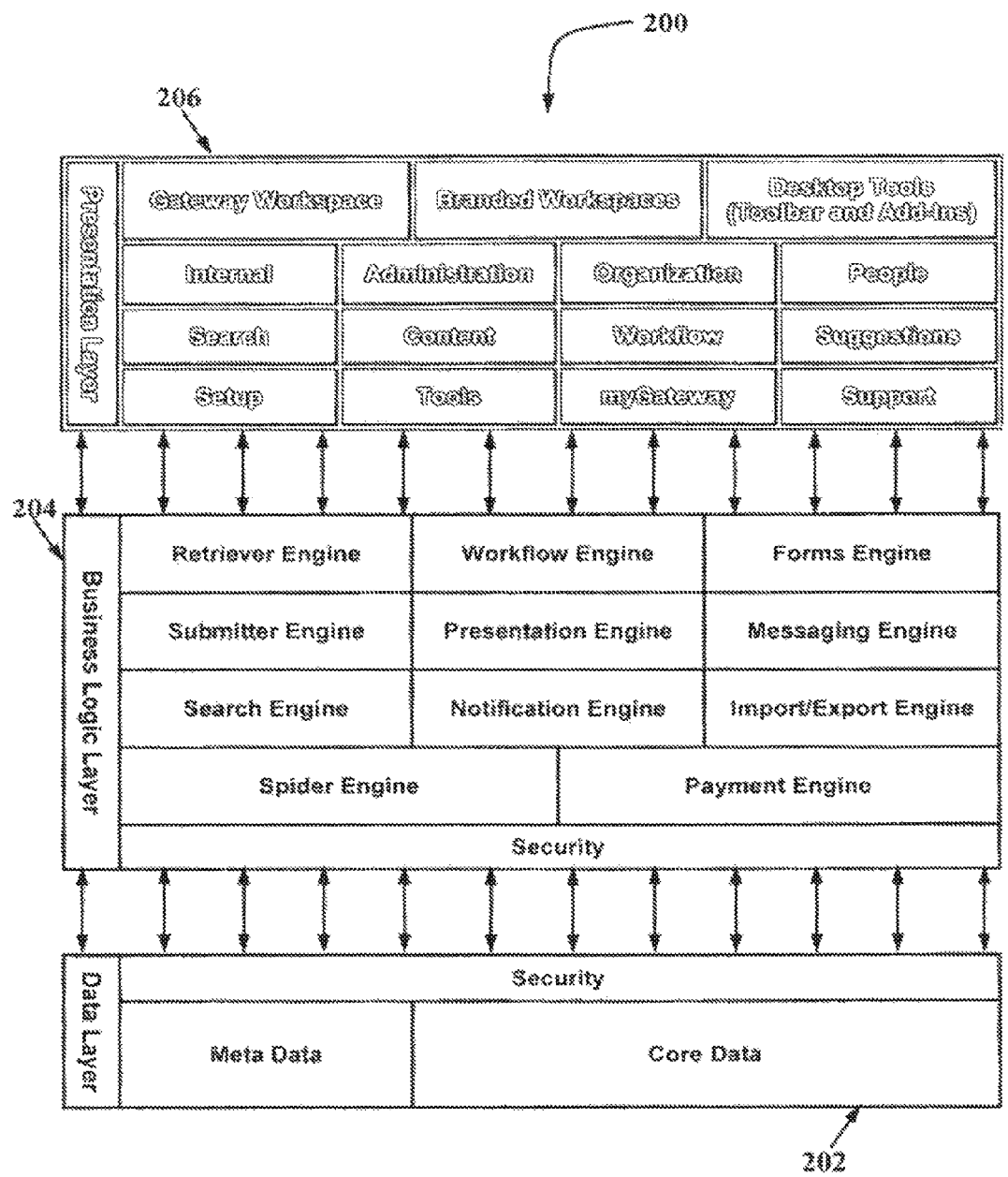
FIG. 2 is a block diagram illustrating the transfer of data through a non-limiting exemplary embodiment of a layered architecture employed by the present invention.

As FIG. 2 illustrates, the present invention utilizes a tiered, or layered, Structure 200 to logically separate the various functionality performed by the present invention. The Tiered Structure 200 includes a Data Layer 202, a Business Logic Layer 204, and a Presentation Layer 206. The Data Layer 202 stores data on the Database(s) 114 for use by the other layers. The Business Logic Layer 204 contains the decision-making and data-processing routines that are executed and carried out by the Server(s) 114 and Router(s) 118, thereby performing the various functionalities of the present invention. And, the Presentation Layer 206 is the user interface for the application by which users are able to utilize the various functionalities of the present invention.

Each layer 202, 204, and 206 is internally self contained and independent of each other layer with data being automatically transferred between each layer in accordance with predetermined protocols. Each layer 202, 204, and 206 includes a plurality of routines that perform the functions associated with that layer. By keeping the layers independent of each other, the routines performed by each layer 202, 204, and 206 can operate independently of each other layer, which provides maximum flexibility to use a wide variety of data with a wide variety of routines. Accordingly, an infinite variety of data types may be utilized by the present invention as more and more varied forms product and service information are incorporated and as the scope and forms of usage of that information expands.

The Data Layer 202 includes multiple forms of Meta Data for classifying and cataloguing the Core Data stored therein. A key to the flexibility of the present invention is that every unit of Core Data stored in the Data Layer 202 can include a wide variety Meta Data attached to it. Each form of Meta Data can support a different routine, or application, accessing the Core Data. By providing different forms of Meta Data for each data field, e.g., product/service/company, the present invention provides the functionalities for the expansion of the Meta Data to support new routines as the scope and usage of the present invention expands. The Data Layer 202 can store product/service data, organization and personnel information, contact information, personal preference information, event information, messages and communications, news, images and just about every other conceivable type of digital information. Because of the multiple forms of Meta Data for each unit of Core Data, the core data can be more efficiently located and utilized by the various functionalities of the present invention. The Data Layer 202 also includes a public directory of data that is optimized to be "scraped" by public search engines, such as the GOOGLE and YAHOO! Brand search engines.

The Business Logic Layer 204 includes a retriever engine, a submitter engine, a search engine, a workflow engine, a presentation engine, a notification engine, a forms engine, a messaging engine, an import/export engine, a spider engine, and a payment engine that each include decision-making and data-processing routines that execute and carry out the various functionalities of the present invention. The retriever engine retrieves data from the Data Layer 202 that is requested by a user at the Presentation Layer 206. The submitter engine submits user commands from the Presentation Layer 206 for processing by the Business Logic Layer 204. The search engine searches the Data Layer 202 in response to user commands from the Presentation Layer 206. The workflow engine organizes the flow of data in and through the Business Logic Layer 204. The presentation engine facilitates the communication of data with the Presentation Layer 206. The notification engine sends notifications, alerts, and messages to users at the Presentation Layer 202 or via substantially any other suitable means, such as e-mail, voice mail, fax, paging, Instant Messaging (IM), Short Message Service (SMS), Really Simple Syndication (RSS), or Ambient Device Orb. The forms engine generates forms for use in the Presentation Layer 206. The messaging engine generates messages for users, processes outgoing messages generated by users, and processes incoming messages generated by users. The import/export engine imports and exports data into and out of the Data Layer 202. The spider engine fetches, analyzes and tracks data outside of the Data Layer 202, such as web sites or databases found elsewhere on the Internet, by periodically monitor a that data and report any changes in its content. And, the payment engine facilitates the entire capture-to-cash cycle for e-commerce within the present invention by automating payment collection, processing, and management over the Network 100.

The Presentation Layer 206 gathers and displays information to users in visual form on various customizable workspaces, or pages, that provide the users with access to and control over the various functionalities of the present invention. The Presentation Layer 206 includes an Internal Section, an Administration Section, an Organization Section, a People Section, a Search Section, a Content Section, a Workflow Section, a Suggestions Section, a Setup Section, a Tools Section, a MyGateway Section, and a Support Section. Each of those sections is described separately in more detail below with respect to each of the modules that provide the functionalities of each section.

The various engines of the Business Logic Layer 204 work together to automatically drive data back and forth between users who are "linked" to that data. Data is linked based on its Meta Data, which supports the functionality for the various routines in the business logic layer that locate that data in the Data Layer 202. Within the architecture of the present invention, data is automatically linked with the Data Layer 202 when it is used in a user's Presentation Layer 206. Thus, whenever the subject data is changed at the Data Layer 202, those changes will be instantaneously transferred to the Presentation Layer 206. For example, if a first user populates a categorized list of people from the Database(s) 116 based on their job descriptions, and a second user changes one of those people's job description in the Database(s) 116, the list will be updated automatically at the Presentation Layer 206. See, e.g., the My Contacts Module, discussed below.

Figure 3:
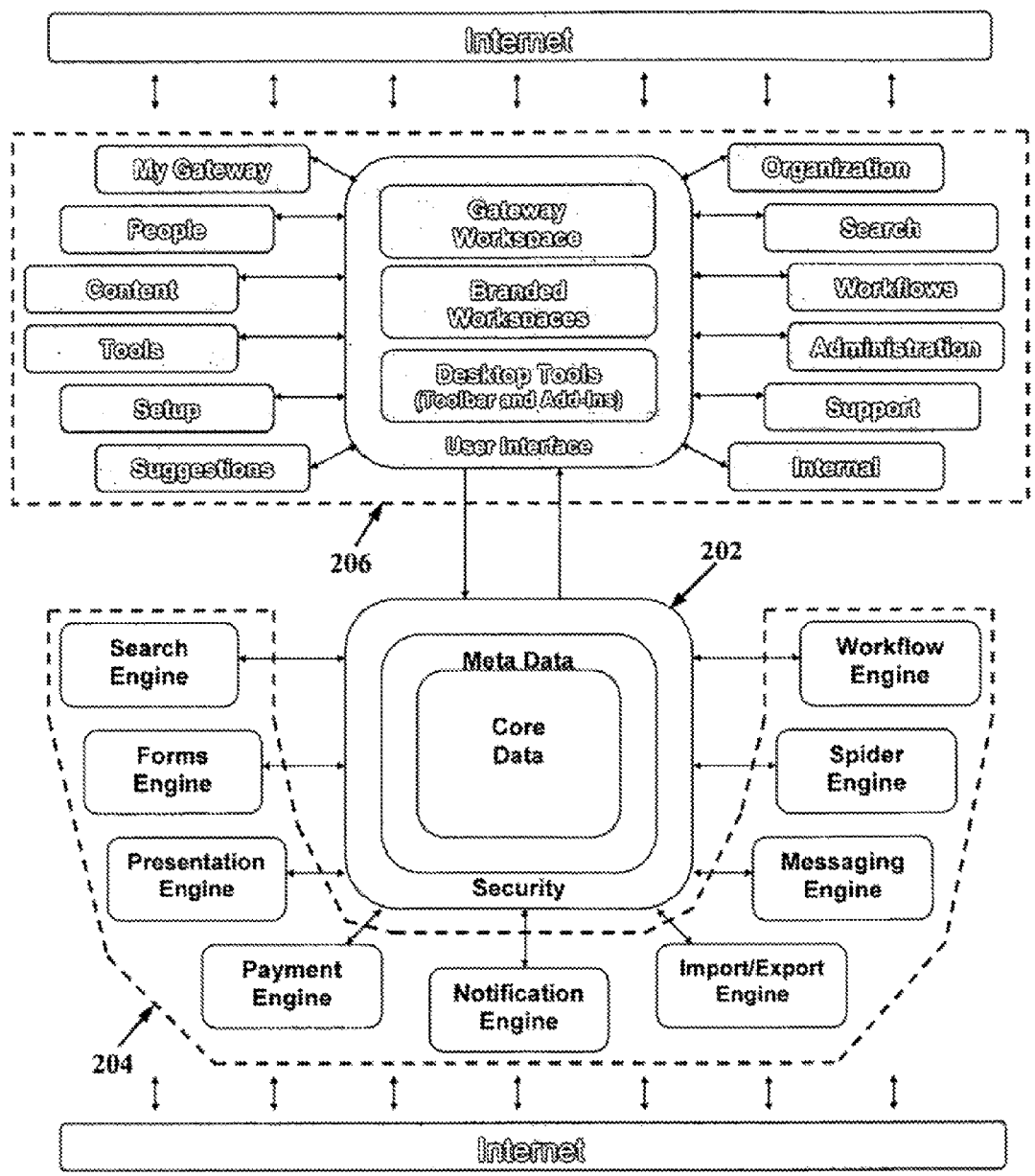
FIG. 3 is a block diagram illustrating the transfer of data through a non-limiting exemplary embodiment of the layered architecture employed by the present invention.

The present invention also provides a rich architecture of web-based applications for inputting, accessing, comparing, sharing, challenging, hosting and researching information across the Internet. To exchange data across the Internet as described, the present invention includes a variety of supporting applications, such as various Application Programming Interfaces (APIs), pre-coded routines and hosted environments. Thus, as FIG. 3 illustrates, the Business Logic Layer 204 not only drives data back and forth between the Data Layer 202 and the Presentation Layer 204, but also between the Data Layer 202 and other locations on the Internet. And, as FIG. 3 also illustrates, the various sections of the Presentation Layer 206 can be used to drive data back and forth between the Presentation Layer 204 and other locations on the Internet. Accordingly, the present invention provides a "Gateway" for ready access to information and information sources and for coordinating the flow of that information back and forth between multiple parties throughout a computer Network 100 and across the Internet. The Gateway may be hosted on the Network 100 by a service provider, i.e., a Gateway Provider.

Figure 4:
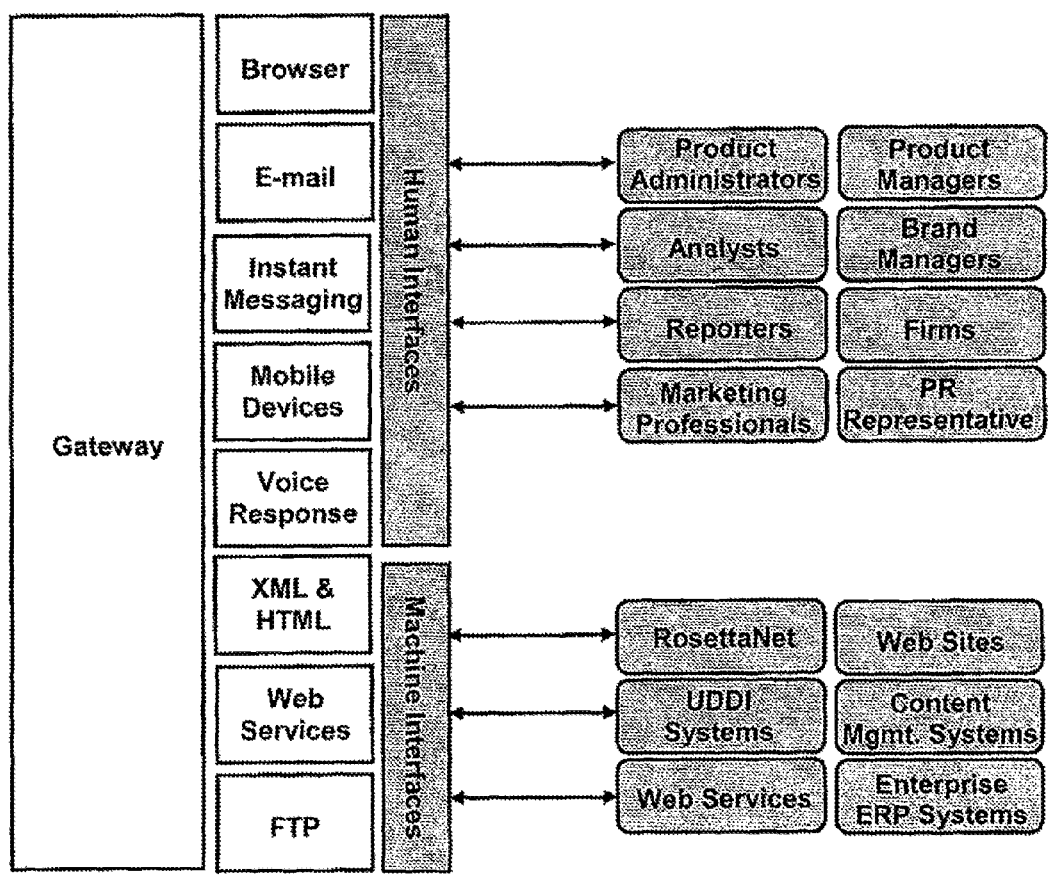
FIG. 4 is a block diagram illustrating a non-limiting exemplary embodiment of the synchronization of data according the present invention.

As FIG. 4 illustrates, the Gateway of the present invention facilitates the back and forth flow of data by interfacing with both people (Human Interface) and computer systems (Machine Interface). The Gateway can send and receive data to and from a user's web browser, e-mail, IM, mobile device, and voice mail on a regular basis, thus ensuring that the user's information is always as up-to-date possible. As also illustrated in FIG. 4, the Gateway can send and receive data to and from a computer system via XML, HTML, FTP and other web service formats. One of the means the Gateway utilizes to achieve such a flow of data is a publicly accessible Meta-Data-driven RSS feed (hereinafter referred to as "the Gateway's wire service")

In the exemplary embodiment of the present invention described hereinafter, a number exemplary sections, modules and widgets within the Gateway are described in accordance with the manner they may be utilized by Influencers, Sellers, and Buyers. Sections are utilized by each user to customize his/her respective Workspace(s) on the Presentation Layer 206 and to interact with the various modules and widgets of the Gateway. Modules are pre-coded routines that carry out the functionalities of particular layers 202, 204, or 206 of the Gateway or carry out integral functions that underlie the functionality of the entire Gateway. And, widgets are small windows that may be used to provide key statistics and activity updates on the Presentation Layer 206 for each of the major modules in the Gateway. It should be understood that the functionality and utility of the Gateway is not dependent on the presence of all of the sections, modules, or widgets described hereinafter. Different sections, modules, and widgets may be added and the sections, modules, and widgets described hereinafter may be added and deleted without taking away from the spirit of the invention.

Foundational Modules

The Gateway also includes a number of integral functions that underlie all of the other modules and functionality of the Gateway. Those integral functions are carried out by a few foundational modules that operate throughout the entire Gateway. Those foundational modules include a Notifications Module, an Alerts Module, a Messaging Module, a Web Conferencing Module, an Audio Conferencing Module, and a Client Aliasing Module. Each of those modules helps support the fundamental purpose of the Gateway of the present invention—to provide functionality that constantly builds direct relationships between people and organizations by facilitating the accurate and continuous flow of information therebetween.

Gateway users often do not know where they will be at any particular time, but editorial and marketing requirements are round-the-clock. Thus, extensive notification capability is needed in order to keep Gateway users informed. To better facilitate the flow of information between parties, the Gateway includes an extensive notifications and alerts system that is controlled by the Gateway's centralized Notifications Module and Alerts Module. Both the Notifications Module and the Alerts Module provide functionality to send users notifications and alerts via substantially any suitable means, such as e-mail, voice mail, fax, paging, IM, SMS, RSS, or Ambient Device Orb. An Ambient Device Orb is a device that changes color, or some other physical characteristic, as a means of conveying intelligent information.

The Notifications Module provides users with information concerning the status of tasks that user is working on, such as the closing of the applications submissions period (Step 10) in the Media Credentialing Module. The Notifications Module creates actionable hyperlinks that, when clicked upon, take a user directly to the place where the user needs to work within a task. The Notifications Module also provides functionality for users to designate which notifications they wish to receive and the means by which those notifications are received.

The Alerts Module is content-oriented rather than task-oriented. The Alerts Module provides users with information concerning data-related events within the Gateway, such as an organization changing the role of certain personnel to which the user is linked in the Organizational Contacts Module. Thus, not only will data automatically flow through the Gateway and be updated wherever it is linked when that data is changed in the Gateway, users can also be alerted of such updates. The Alerts Module also provides functionality for users to designate which alerts they wish to receive and the means by which those alerts are received. Gateway Provider Administrators maintain all system alerts within the Alerts Module and can create new alerts using various system parameters that tie the alerts to data-related events that occur in the Gateway.

The Messaging Module provides users with basic e-mail functionalities that enable users to send and receive e-mails to a "Gateway Inbox," i.e., users are provided with a Gateway e-mail account.

The Web Conferencing Module provides functionality for users to share computer workstation screens, chat, take and share notes, view participant lists and other standard web conferencing capabilities, similar to such services as WEBEX, PLACEWARE, and RAINDANCE brand web conferencing services. The Web Conferencing Module utilizes all of the functionalities of the Gateway, enabling the immediate sharing of any page or data within the Gateway via the various forms of notifications, alerts, and messages generated by the other foundational modules, both within the Gateway and throughout the Internet. The Web Conferencing Module provides functionality for either point-to-point web conferencing between two parties or multi-point web conferencing between a larger number of parties.

The Audio Conferencing Module provides functionality for direct or conference calls between parties. Audio functionality is provided either via voice over IP or by direct dial bridging. The Audio Conferencing Module can be utilized with the Web Conferencing Module to provide an additional layer of communication to web conferencing. An exemplary use of the integrated voice/data/video technology of the Web Conferencing Module and the Audio Conferencing Module would be for a Seller to give a product briefing to a group of Influencers or for a product manager and a Public Relations (PR) firm to share a screen to discuss an entry in a Buyer's Guide.

The Aliasing Module provides the functionality for the Gateway Provider to assume the access rights and system view of a particular user, without specifically having to log in as that user. When a Gateway Provider Administrator user aliases another user in this manner, the party who is aliasing the user can access data in the Gateway to the extent the aliased user has been granted access to that data.

Internal Section

The Internal Section of the Gateway is only accessible to Gateway Provider Administrators. The Internal Section provides key support and information processing tools that enable Gateway programmers and support personnel to track and support customers. The Internal Section also enables Gateway Providers to track their sales prospects, their implementations, and their entire development stack of tasks. For example, the Gateway Provider can access and view outstanding tasks to be developed, and generate reports that summarize the Gateway accounts that a Gateway Provider Administrator is managing via the Internal Section. The modules that provide such include a Gateway Security Module, a Gateway Tasks Module, a Gateway Reports Module, a Gateway Identities Module, a Gateway Processing Module, a Gateway Press Releases Module, a Gateway Form Editor Module, a Gateway People Administration Module, an Gateway Organization Administration Module, a Gateway Maintenance Module, and a Gateway Help Editor Module.

The Gateway Security Module provides Gateway Provider Administrators with functionality to edit any user access rights to any module in the system. The Gateway Security Module provides access by groups of modules so access levels can be easily changed by a selection pull down menu. And, if necessary, Gateway Provider Administrators can also view and change users' IDs and passwords in the Gateway Security Module. All access rights to modules as governed by a user's subscription plan with the Gateway Provider are also managed in this module.

The Gateway Status Module provides functionality for Gateway Provider Administrators to view any problems that may exist in various other user modules of the Gateway, such as whether the retrievers that are being run for users have failed, or if the backend spiders that feed them content are running properly. The Status Module also provides a status of all outside feeds, such as transfers of information via FTP to other hosts. The Status Module also provides functionality for a Gateway Provider Administrator to view the status of all Alerts being sent by the system to make sure that there are no backlogs or other issues with those important communications.

The Gateway Tasks Module provides the Gateway's main programmer interface with the Gateway where programmers are assigned tasks. All active programming tasks are listed, prioritized, and applied status in this module. Only members of the Gateway Provider's programming and operations staffs are given access to the Gateway Tasks Module. All customer bug and feature requests flow through this module. The Gateway Provider Administrator can create reports to track developed work versus new requirements and create listings on the fly of tasks by status, project, category, programmer, priority, last update, and other key variables. The task lists and reports are fully searchable within the Gateway Tasks Module as well. Each programmer has access to his own My Tasks page to view all pertinent tasks that are commented to or otherwise actioned to the programmer, as well as projects and tasks that the programmer is tracking.

The Gateway Reports Module provides a Gateway Provider Administrator with key overview reports on every aspect of Gateway activity. The Gateway Reports Module provides access to a series of reports that include information about the pace of development, the health of the various servers and systems in Gateway, the movement of new users through the startup processes, user access history, activity within the system, and other such important items. Reports may be added or modified based on user feedback and information requirements. And, saved versions of commonly run report settings may be quickly re-run so Gateway Provider Administrators do not have to reconfigure various parameters to match their intended output. All Gateway system reports are accessible through the Gateway Reports Module, and in some cases, within other context-specific modules as well.

The Gateway Identities Module provides functionality for a Gateway Provider Administrator to assume a generic role as an internal employee of an organization on the Gateway, seeing whatever the basic level of employee at that organization is allowed to see. The Gateway Identities Module is used by the Gateway Provider to provide support for customers to see what the average customer sees on the Gateway. If the Gateway Provider Administrator wishes to see what a specific individual user sees on the Gateway, then the Gateway Provider Administrator would not use this feature, but rather would use the Internal/Security Module to look up the specific user in question and log in as that user.

The Gateway Data Sources Module provides functionality for Gateway Provider Administrators to view the current data sources and spiders in the Gateway. The Data Sources Module also provides functionality for a Gateway Provider Administrators to define, develop and implement new data sources and to define, develop, and implement rules to monitor and flag spiders that are not working properly, which enables Gateway Provider Administrators to take a pro-active approach to regular auditing of spiders.

The Gateway Processing Module provides functionality for the Gateway Provider's processing staff to process information from the Internet and various outside databases prior to storing that data on the Gateway's Database(s) 116, including data retrieved from the Electronic Data-Gathering, Analysis, and Retrieval (EDGAR) system. The Processing Module also provides functionality for Gateway Provider processing staff to review and otherwise maintain the Gateway's Database(s) 116 via rules-driven processing jobs, such as programming code that is scheduled to run frequently and look for problematic data in the Gateway, e.g., to look for instances in the company profiles in the Gateway's Database(s) 116 where the country code in the phone number field for a record does not match the country code of the country listed in the physical address field of the record. The Gateway Processing Module shows a user any similar data, such as companies with the same name, so the user can selectively process the data to avoid the entry of duplicate records into the Gateway's Database(s) 116. The Gateway Processing Module allows the user to assign data to certain categories of content, such as Companies, People, Products, Events, and Publications. By categorizing the data for storage in this manner, i.e., assigning Meta Data to Core Data, the processed data is more easily utilized by the many functionalities of the Gateway. Suggestions from the Suggestions Section may be processed into the Gateway's Database(s) 116 via the Gateway Processing Module.

The Gateway Press Releases Module is a specialized parsing and processing module that is provided to evaluate press releases and events listings from various public sources and to sort the data within the listings into those pieces of information desired by the Gateway. The data is manually processed by Gateway Provider processing staff, who evaluate data presented on a screen as being parsed correctly, e.g., putting PR representative names in the right boxes and capturing the right relationships among the parties represented in the press release. This module provides functionality for new industries to be added to the Gateway as it provides the system with data about organizations active in marketing, their internal and external PR representatives, and background information on key organizations. That data is split out and processed into the Gateway's Database(s) 116 for later updating and approval by the organizations as they are asked to enter the system, for example, by Influencers via the Suggest-A-Company Module.

The Gateway Form Editor Module provides functionality for all pages within Gateway to be created, edited, and updated. The Gateway Form Editor Module provides functionality for defining how form pages are laid out, how data is accepted and validated by the Gateway, how Help is accessed by users, and other key structural handling of information in the Gateway. The Gateway Form Editor Module can be accessed only by Gateway Provider Administrators via the Internal Section of the Presentation Layer 206.

The Gateway People Administration Module provides functionality for Gateway Provider Administrators to access and edit users' Personal Profile records, including the ability to merge duplicate people records into one record. Via the Gateway People Administration Module, Gateway Provider Administrators can view and edit the profile information about a specific user, including the roles that user is assigned. Gateway Provider Administrators can also add new roles for users in this module, such as making a user within an organization responsible for that organization's public relations activities.

The Gateway Organization Administration Module provides functionality for Gateway Provider Administrators to access and edit organizations' records, including the ability to merge duplicate organization records into one record. The Gateway Provider Administrator can view and edit organizational profile information, including the roles that organization is assigned. Via the Gateway Organization Administration Module, Gateway Provider Administrators can add new roles for users, such as making a user within an organization responsible for that organization's public relations activities. The Gateway Organization Administration Module also provides functionality for Gateway Provider Administrators to view background profile information, appropriate industry identifications, e.g., their DUNN's brand ID, the present contacts and users in the Gateway listed under that organization, logos for the organization, stock trading information for public companies, listed directories in which the organization is listed, and other such pertinent information. Gateway Provider Administrators can change any of that data to better reflect an organization in the Gateway's Database(s) 116.

The Gateway Maintenance Module provides functionality for Gateway Provider Administrators to directly monitor, edit, and maintain every type of data in the Gateway's Database(s) 116, such as organizations' records and profiles, individual users' records and profiles, product records, event records, white paper records, etc. Accordingly, the Gateway Maintenance Module provides centralized data management functionality by providing a single place to maintain data, which complements the Gateway Processing Module and the Gateway Data Sources Module—both of which are designed to import and track data for the Gateway.

The Gateway Help Editor Module provides Gateway Provider Administrators with functionality to quickly update the Help text on any page in the Gateway. For example, if the Gateway Provider's customer service department notices that a particular page is misunderstood by some users, the Help text can be immediately edited in real-time using the Gateway Help Editor Module.

Administration Section

The Administration Section of the Gateway is used by Gateway Account Administrators, i.e., the administrators within an organization managing that organization's Gateway account, and the users to which they provide access, e.g., an organization's administrator in charge of managing some of the more technical and sensitive areas of Gateway's functionality. An organization's level of access to the more technical and sensitive areas of the Gateway's functionality is determined by that organization's account level with the Gateway Provider. All security and access privileges are set in the Administration Section, as well as all settings and permissions for data feeds and direct website access. For example, an organization's administrator can set the access and privilege rights to give the Gateway access to transfer data directly to that organization's websites outside of the Gateway. The modules that provide such functionality include an Organizational Status Module, an External Hosts Module, a Data Schedules Module, a Presentations Module, a Web Sites Module, a Newsletters Administration Module, a SPAM Backlist Checker Module, an Access/Security Module, a Reports Module, a Toolbars Module, and an Accounts Module.

The Organization Status Module provides functionality for a user to change the status of an organization under the account for situations such as mergers, acquisitions, name changes, etc. Any such changes automatically flow through all of the locations that the organization's data is used in the Gateway. For example, when an organization's administrator uses this module to process major corporate changes, such as merging with another company, being acquired by another company, acquiring another company, changing company name, declaring bankruptcy, or going out of business, that change will automatically cause the organization's status to be updated and changed on all user-created lists on the Gateway that include that organization. The Organization Status Module also provides functionality to maintain the organization's proper relationship to other organizations, e.g., a parent/child relationship, and to related records within the Gateway's Database(s) 116.

The External Hosts Module of the Gateway provides functionality for users to set up an authenticated FTP relationship between the Server(s) 114 on the Gateway and a secure area on a user's servers outside of the Gateway. Such external servers also include "Payment Gateways" that let users set up an e-commerce path so that the Gateway can collect payments on behalf of a user's organization. Because those servers exist outside of the architecture of the Gateway, an authenticated FTP relationship must often be established before linking data on the Gateway's Database(s) 116 to those secured areas. This functionality is most often utilized by users who wish to drive automated content from the Gateway to their own websites, using information derived from content stored on the Gateway's Database(s) 116, e.g., online directories, buyer's guides, surveys, etc. Users with websites can enter one or more user ID and password in the External Hosts Module to give the Gateway access to transfer data to a secure part of those websites with an engine such as the Gateway's import/export engine. The External Hosts Module can be used, for example, with the Awards Module to facilitate the collection of a payment for submission of a nomination to an award organizer within the workflow of that module.

The Data Schedules Module provides functionality for a user to set up schedules to move linked information from the Gateway's Database(s) 116 to a user's servers outside of the Gateway. Because those servers exist outside of the architecture of the Gateway, those servers may not include routines that can properly process the data in the format that it is stored within the Gateway. The Data Schedules Module defines what information to move, when to move it, and where to send it. The Data Schedules Module can export data in a number of formats, such as XML, Access, XLS, and text. That information can include web pages created, for example, by the Presentations Module, or large amounts of stored data created by one of the content-driven Modules, such as the Buyer's Guides Module. A user can also use the Data Feeds Module to set up data transfers to occur on a scheduled or on-demand basis. For example, a user can schedule data transfers to occur to his/her server as often as every 30 seconds or as seldom as once weekly. Or, the user can immediately drive data to his/her server without waiting for a scheduled event to occur.

The Presentations Module provides functionality for users to create and edit web pages containing information from the Gateway and then publish those pages to a website. For example, a user can publish directories, buyer's guides, survey results, organization profiles, news, press releases, white papers, events, glossaries, FAQ pages, links, and other Gateway information to the user's web page. The Presentations Module provides the user with pre-defined templates to easily create web pages. In the alternative, the Presentations Module provides functionality for the user to create new templates or modify existing templates to make the pages fit into the exact look, feel, and functionality the user desires. The Presentations Module also provides a what-you-see-is-what-you-get (WYSIWYG) editor that provides functionality for users to edit their web pages without having to learn the technical details of HTML.

The Websites Module provides website creation and editing functionality for users to create and edit web pages. The user's web pages can be managed from within this module and automatically updated when any info is changed and saved via the module. Additionally, information can be linked to Gateway content via the Presentations Module of the Gateway. If the linked information changes in the Gateway, for example, using the Data Schedules Module and the External Hosts Module to schedule updates or immediately drive data to the web page, that information will be driven automatically to the website's pages. And, because, for example, the Gateway Processing Module and the Retrievers Module can gather information from outside the Gateway and process it into the Gateway's Database(s) 116, the functionality of the Presentations Module can effectively automatically update the user's web pages even with data from sources outside of the Gateway.

The Newsletter Administration Module provides functionality for users to manage their e-mail-based newsletters. A user can manage a newsletter distribution list and allow people to sign up for the newsletter via the user's website. The Newsletter Administration Module also provides functionality for a user to include information that the Gateway gathers automatically for the user, such as via the Retrievers Module, including articles, press releases, and white papers. The Newsletter Administration Module is based on the Presentations Module, so the user can publish the user's newsletters using rich HTML-enabled templates. The Newsletter Administration Module will also coordinate links to external e-mail distribution services for the mass transmission of e-mails using specialized e-mail transmission service providers.

The SPAM Blacklist Checker Module provides functionality for a user to check if an organization's mail server IP address has appeared on any of the dozens of SPAM blacklists that are available electronically. Users can search for their personal domain names as well. Each entry in the table of IP addresses to be checked includes the ID of the organization that owns the mail server. In conjunction with the Messaging Module, users can be alerted by the SPAM Blacklist Checker Module that their outbound e-mails have been categorized by anti-spam software as spam and, therefore, may not be getting to their intended targets.

The Access/Security Module of the Gateway provides functionality for an organization's administrator to grant or deny internal and external parties access to the organization's Gateway account and, therefore, to the data stored on the Gateway's Database(s) 116. While anyone may go to the Gateway and register, even identifying themselves with a specific organization's Gateway account and records, that person cannot do anything in that account until granted access by that organization's administrator. Accordingly, the system will automatically request access for each user from the administrator of that respective company via the Access/Security Module when each user registers himself to that account. When requests come into the Access/Security Module, the organization's administrator will receive notifications and alerts as defined in their Notifications Module and Alerts Module. In the alternative, where the organization's administrator registers a user to the organization's Gateway account, that administrator will grant the desired accesses when he/she registers the user to that account. When a user is granted access to an organization's Gateway account, the organization will be added to the user's personal Identities list of accessible companies, which will be made available to the user for easy navigation between accounts in the user's company pulldown select listing that is present on each page of the Gateway. See, e.g., the Setup Identities Module, discussed below. With such access, a user can work side-by-side with other approved users of the same organization and collaborate within the same workspace. The Access/Security Module operates in conjunction with the other functionalities of the present invention to allow parties internal and external to an organization to work on the same task in the Gateway, in a multi-user, simultaneous manner. For example, this module may be used in conjunction with the Setup Identities Module by a PR firm to allow a client to alias an internal employee of the PR firm so that the client can help maintain product information, respond to reporter inquiries, see if product managers have filled out a survey, or any of a number of PR activities. Such symbiosis was not possible prior to the Gateway of the present invention.

The Reports Module provides functionality for a Gateway Account Administrator to generate key overview reports for his/her organization's Gateway account, including usage and other activity data across all modules. Gateway Account Administrators can view reports on user access, activity within the system, e-commerce transactions, and other such important items. For example, Gateway Account Administrators can see whether all of their users are regularly updating the information they are responsible for keeping current. Also, Gateway Account Administrators can see key indicators of the use of their data by others, across the modules. Such reports can be added regularly based on user feedback and information requirements.

The Toolbar Management Module provides functionality for Gateway Account Administrators who have chosen to launch into the market a branded version of the Gateway's Toolbar product with insightful information about propagation and use of that customized toolbar. The Toolbar Management Module provides Gateway Account Administrators with the functionality to view which users downloaded the toolbar, upgraded to new versions of the toolbar, or uninstalled the toolbar. Gateway Account Administrators can also control the system parameters for the toolbars issued to users on their account, such as for advertising buttons on the toolbar or for default information listings in the toolbar.

The Accounts Module provides functionality for Gateway Account Administrators to review extensive histories and the present status of e-commerce in relation to their own processes, which are run on the Gateway platform, and processes the account users take part in. For example, if a Gateway account is using the Buyer's Guide Module to charge other users to enter information into a Buyer's Guide, then the revenues, credit card transactions, invoices (including outstanding invoices) and other e-commerce related information will be presented to the Gateway Accounts Administrator via this module. The Accounts Module also provides functionality for Gateway Account Administrators to view the status (including those accounts that payments are current on, those with upcoming renewals, and those that are expired) of all instances where the account holder has subscribed to services run by other organizations using the Gateway system. Extensive reporting is provided in this module. All credit card transactions can be viewed in detail, and there is functionality to process credit card refunds. In addition, all invoice transactions can be viewed in detail level, and there is functionality to process paid invoices.

Organization Section

The Organization Section of the Gateway provides functionality for a user to control the way his/her organization, or company, is represented throughout the Gateway. Basic organization information can be placed on the Gateway with the Organization Section to create a profile for an organization. Information such as logos, publications, classifications, investor/client/partner relationships tell the organization's story in some fashion and, in aggregate, define the organization to the world at large. Individual modules help support the Organization Section to maintain that information in the associated Database(s) 116 and across the Internet. For example, an organization's logo will automatically update across the Internet for any entity linked to that logo whenever when the organization updates that logo on the Gateway. The modules in the Organization Section that provide such functionality include an Organization Profiles Module, an Organization Logos Module, a Publications Module, an Organization Directories Module, and a Relationships Module.

The Organization Profiles Module provides functionality for users to create multiple profiles for an organization by industry, by topic, by product, or by whatever category desired. Organization profiles are often used throughout the marketing process to provide summaries of various organization operations, such as in "About" boilerplate paragraphs in press releases, on membership pages at association and forum sites, in speaker introductions at events, and in tradeshow directories. Although short summaries about organizations can often be found in many different places, those summaries are rarely centrally coordinated by the organization's marketing department and are often an afterthought to the organization. Moreover, organizations sometimes use generic summaries when more specific summaries are more appropriate. Accordingly, the Organization Profiles Module enables users to create multiple specific profiles for an organization in a central place in the Gateway where they are then accessible throughout the Gateway. The Gateway supports creating profiles by location (headquarters versus branch offices), by use (by use for an Association Profile, in a Workflow, etc.), or other such instances.

For example, if a user is creating a profile for an organization in a particular industry, the user might use an industry-specific template on the Gateway or create a custom profile on the fly. Creating a profile listing merely requires placing the relevant information on the Gateway's Database(s) 116. By creating multiple Gateway profiles with the Organization Profiles Module, users can create a range of broadly-defined as well as very narrowly-defined profiles that will collectively define the company's image (through the data) on the web when those profiles are utilized in various processes, such as the workflow-driven processes of the Buyer's Guides Module and the Gateway Directories Module. By creating specific profiles in response to specific users' requests for certain information and linking each separate profile to an industry, topic, product, etc., on the Gateway, an organization is able to change their web presence by merely changing the content of the profile at a single, central location, i.e., on the Gateway's Database(s) 116. Once changed on the Gateway's Database(s) 116, those changes will automatically flow to users who are using that information throughout the Gateway.

The Organization Logos Module provides functionality for organizations to maintain more control over the use of their logo on the web. Logos are used extensively all over the web, and many times without the permission of the logo's owner. By merely uploading their logos to the Gateway Database(s) 116 with the Logos Module, organizations can allow other entities to link, download, or otherwise use the logos from the Gateway. The Logos Module also provides functionality for organizations to restrict use of those logos to terms of usage that a user must read and agree before downloading the logos. If an organization changes its logo, the organization need only upload the new logo to the Gateway's Database(s) 116 and designate that logo as its primary logo, and the new logo will be pushed through the Gateway to update the logo across the Internet wherever someone is linked to that logo, such as via the Data Schedules Module and the External Hosts Module. Users can also set up alerts to occur via the Alerts Module to inform that user when such uploads occur.

The Publications Module provides functionality for those organizations that are publishers to represent their "products" at an organizational profile level within the Gateway, prompting publishers to enter key data about their newspapers, magazines, online sites, and other publications. Such data includes editorial calendars, staff, and beats/topic areas. The Publications Module provides publishers with functionality to create a massive organizational profile for each publication, enabling other users to track and use that data in the Gateway's many systems and processes. That data can be used on the publisher's own website.

The Publications Module also causes changes in the organization's information for a product to be pushed out to key publisher tracking sites that link to the organization's Gateway content. Accordingly, the Publications Module enables publishers to ensure that the information about their products is as current as possible by providing a central access point for the publisher's Gateway account users to enter and update information that appears on an organization's website as well as throughout the web. For example, an organization may use the Publications Module to enter information about the detailed upcoming editorial calendar for a specific publisher product or service so that the information can then drive other Gateway processes, such as using the notification engine to tell all the PR firms interested in those topics that new editorial opportunities are on the way, or using the Presentations Module to display the data on the publisher's or other entity's website.

The Organization Directories Module provides functionality for a user to determine where an organization's profiles will be listed by providing functionality for a user to select those directory categories and other similar profile-based instances in which the user's organization conducts business. One of the hardest parts of marketing is making sure that an organization is placed in the right categories. Being compared with the wrong products or the wrong competitors can be devastating to an organization. Accordingly, the Organization Directories Module provides users with the functionality to specifically list their organization in dozens of directories, yellow pages, links listings, etc., by merely applying their profiles from the Organization Profiles Module to the desired categories. A user need only click on the correct categories and select the appropriate profile to associate with that category in order to properly classify his/her organization. The Organization Directories Module enables an ongoing management of those directory listings too—as categories are added in the Organization Directories Module, Gateway users may receive alerts of those additions through the Directory Widget on the MyGateway page, and via the Alerts Module. If any costs are required for posting to any particular directory, the Gateway can handle such e-commerce on behalf of the directory. The Organization Directories Module also provide users a visual summary of those directories where the users may not have updated their information recently, prompting users to confirm that category selections and profile info is still current and correct. Users can click on a thumbnail image of the directory to view a cached image of their directory listing. Accordingly, the Organization Directories Module is a user's path to ensuring that an organization is optimally positioned in the marketplace.

The Relationships Module provides functionality for users to identify client, partner, investor, and supplier relationships and request access to any of those parties' Gateway records. Once approved, users can use the functionality of the Identities Module to quickly switch among relationships and gain access to needed information as allowed by the party granting access. Also, lists of clients, partners, investors, or suppliers can be published to user websites so that an organization could maintain a page that lists the logos, organization profiles, and website addresses of that organization's clients, partners, investors, or suppliers, all of which are updated by the Gateway whenever a client's information is modified in the Gateway's Database(s) 116. For example, as is often popular with startup organizations trying to legitimize themselves, an organization can populate a list on the organization's website with all of that organization's partners with a simple mouse click to add each partner and a hyperlink to each partner's website.

People Section

The People Section of the Gateway provides functionality for organizations to communicate throughout the Gateway about their key people and the roles played by those people. A fundamental feature of the People Section is its ability to assign ownership and control of roles and responsibilities to various people within an organization, such as who is in charge of booths at tradeshows or who is the organization's representative to a particular forum or association. As organizations grow larger, it is particularly difficult to keep track of such assignments, both internally and externally. Reporters, editors, event organizers, etc., all need to be able to efficiently identify and converse with the right people. The People Section facilitates those communications by clearly assigning specific roles to specific people. As those people leave the organization or change jobs, the roles can be easily re-assigned to others. Individual modules help support the People Section by causing such changes and updates to flow through the entire marketing information chain via the web. Accordingly, the People Section enables organizations to assign roles to their entire extended family of people to enable entities throughout the Gateway to get an accurate view of the people who make their organization work on a day-to-day basis, such as subcontractors and partners. The modules that provide such functionality include an Organizational Contacts Module, a My Contacts Module, and a Roles/Organization Module.

The Organizational Contacts Module provides functionality for a user to create a listing of the individual personal profiles of all the people that are associated with a user's organization, both internal and external. When a user needs a complete listing of personnel for whatever reason, that listing can be pulled from the Organizational Contacts Module. If someone leaves the organization or changes jobs, the user can navigate to the Organizational Contacts Module and update that person's records on the Gateway's Database(s) 116 and this update will flow throughout the Gateway where users are linked to that data, thereby keeping that data current. When individual users access the Gateway, they are prompted to maintain their own records as well, providing another check for data accuracy and currency.

The Organizational Contacts Module also provides functionality for a user to assign roles and Gateway access to that organization's various contacts, both internal and external. For example, if a Gateway Account Administrator adds a contact via the Contacts Module, the user is automatically granted access to the Gateway Account Administrator's account, similar to how access is manually granted to requesting users in the Access/Security Module. Using the Organizational Contacts Module, a user can click on a contact profile to see all of the contact's Personal Profile information and send an e-mail or download Vcard information about that contact.

Many organizations represent more than themselves in a marketing capacity. For example, PR firms often have multiple client relationships. With the Organizational Contacts Module, users can view the most current organizational roles for each user because, as a user is assigned a role, the Gateway reacts to that updated information the next time it encounters the information in the normal course of operations by pushing the updated information throughout the Gateway. Thus, when a Gateway Account Administrator goes to add a contact to a workflow process, such as the media credentialing process in the Media Credentialing Module, he/she can see the most current roles of each person within an organization and can accurately select the contacts with the role required for that process, such as users with a PR role for the media credentialing process. Roles are managed in the Roles/Organizations Module as described below.

The ability to centrally view the roles of all members of an organization and to be able to manage and update those roles in a central location was not possible prior to the Gateway of the present invention. Using the present invention, PR representatives who represent many clients can be listed on the Organization Contacts list for each client, thereby optimizing their public association with those clients. Once listed in the Contacts area, the PR representatives can work together with the client's own contacts in the system. Each party sees what the other sees to the extent that they have been granted access to those Gateway records. Accordingly, a PR firm can allow external contacts to help maintain product information, respond to reporter inquiries, see if Product Managers have filled out a survey, or any of a number of PR activities. Thus, the Organizational Contacts Module operates in conjunction with the other functionalities of the present invention to allow parties internal and external to an organization to work in concert, in a multi-user, simultaneous manner. Accordingly, such symbiosis was not possible prior to the Gateway of the present invention.

The My Contacts Module is a central address book for Gateway users where each user can compile his/her lists of contacts that he/she wishes to interact with in the Gateway. The My Contacts Module can be used to aggregate Gateway users into groups that facilitate interaction between those users. The My Contacts Module provides functionality for users to create lists of other users or organizations, both registered and not registered with the Gateway. Those lists are not static and can be set up by roles instead of by specific user or organization. Accordingly, when users create lists of other users based on those other users' roles within certain organizations and an organization changes any of those other users' roles within that organization using, for example, the Roles/Organizations Module, such changes will flow throughout the Gateway and update each of the users' lists automatically. And, similar to the Gateway Directories Module, if users create lists of organizations based on those organizations' segment in an industry, organizations will be added or deleted from those lists automatically as the organizations join or leave each listed segment of industry. Accordingly, users can track the personnel within organizations and organizations within certain segments of industry using the My Contacts Module. And, because, for example, the Gateway Processing Module and the Retrievers Module can gather information from outside the Gateway and process it into the Gateway's Database(s) 116, the functionality of the My Contacts Module can track the personnel and organizations even where those personnel and organizations are not registered with the Gateway. The My Contacts Module also provides functionality for users to import or otherwise link to contact lists in other systems, such as the LINKEDIN and PLAXO brand social networking systems, to invite those contacts to take part in the Gateway and to apply those contacts to groups created by the user in the My Contacts Module.

The Roles/Organizations Module provides functionality for an organization's administrator to assign professional roles to users, complete with their Public Profile information, both within that organization, e.g., Board of Director positions, media relations positions, event responsibilities, etc., as well as outside that organization, e.g., association roles or judges for awards contests. The Roles/Organizations Module provides functionality for users to illustrate hierarchical structures, like organizational charts, to illustrate parent/child relationships within an organization. This feature is particularly useful in large public relations groups where different people might have different areas of operation, e.g., "Northeast", or different client bases, e.g., "Printers". The Roles/Organizations Module also provides functionality for users to place people in multiple positions within the organization since, in practice, most people hold many roles in an organization, e.g., "PR Representative", "Sales Contact", "Reporter", "Editor". For example, a user who is an account representative can assign the role of client to any user that the account that representative represents. Illustrating such relationships makes it easy for outside personnel, such as editors and analysts, to know which people cover which clients. Accordingly, using the Roles/Organizations Module, a user can click on a person's record to view not only their contact and background information, but also all the roles that the person holds in an organization and the people that person represents. Roles are easily reassigned with the Roles/Organizations Module, especially when contacts are removed from the Organization Contacts listing, because, when a user deletes a person from an organization, the user will be prompted to re-assign any roles that the deleted person was assigned to a current user on the organization's Organization Contacts listing.

Search Section

The Search Section provides functionality for a user to search the Database(s) 116 of the Gateway as well as other data throughout the web. The Search Section provides a user access to various searching functionalities of the Gateway, including a Retrievers Module, a Search Module, a Branding Assistant Module and other various Gateway Tools, such as the Firefox Gateway Toolbar Module and Microsoft Office Gateway Add-In Module found in the Tools Section, thus making it easier for a user to find exactly what the user is looking for on the Gateway and across the Internet.

The Retrievers Module provides functionality for users to gather information from the Internet and various outside databases via the Gateway's spider engine and search engine and to provide requested data to the users requesting that data. The Gateway's spider engine is used to gather data and store that data on the Gateway's Database(s) 116. A user uses the Gateway's search engine to define keywords and target websites from which they wish to receive information. The Retrievers Module then periodically queries the search engine for the requested data and sends new or updated data to the user. For example, the Gateway's spider engine can be set up to find press releases, articles, white papers, case studies, books, event listings, FAQ listings, and glossary listings based on a user's pre-defined keywords and target websites. The retrieved data is presented to users in bulk or in item-by-item processing form so that the information may be edited and approved by the user for transferring to a user's server(s) outside the Gateway for publishing to that user's or organization's website, or for displaying in a user's Retrievers Widget. Accordingly, users can publish content retrieved from the Internet to their websites—formatted, sorted, and complete—by simply linking to that information on the Gateway with one mouse click per item. In addition, the Retrievers Module automatically updates information on the Gateway's Database(s) 116 based on a comparative analysis between the information retrieved and that information already stored on the Database(s) 116.

The Retrievers Module also provides functionality for users to create Topic Sets to accompany the processing of retrieved data. Topic Sets are generally tags that allow the user to check a box next to a topic to associate the retrieved data with a particular topic. For example, if a user has a website with five sections, the names of those five sections can each be a topic within a topic set and, when processing a retrieved item, any topics checked off will be associated with the retrieved item. By associating the retrieved data with one of those five sections, the retrieved data will be properly grouped by sub-topic when presented to the user's website using the Presentations Module. The Retriever Module also enables users to create RSS streams of their data or to e-mail the results of a retriever search to an e-mail destination. When dealing with a retriever for the first time, a user can opt to retrieve only data that was created later than a specified date. Additionally, users can store keyword sets in the Retrievers Module to use across different retrievers.

The Search Module provides functionality for users to conduct direct, standalone searches of the Gateway's Database(s) 116. Users can, for example, "Search for this exact phrase", "Search for all of these words", or "Search for any of these words" to maximize their search effectiveness. Users can save search criteria as a "Saved Search" and revisit the results of the Saved Search whenever they want. Users can also set up the Search Module to constantly run searches based on the Saved Search criteria and to provide them with alerts when the Saved Search finds new items. The search functionality of the Search Module can search the Gateway's Database(s) 116 for matches in organizations, logos, people, roles, beats, products, publications, editorial opportunities, events, white papers, classifications, articles, press releases and other content types supported by the Gateway. Because the Core Data in the Gateway's Database(s) 116 is actively and purposefully categorized and classified with multiple forms of Meta Data, searching the Gateway's Database(s) 116 is more successful and efficient.

The Search Module provides tabs within the results returned by searches and displays the results in a number of formats and manners depending on the keyword search terms used, including the following:

9. Organizations: Provided where the keywords match the organization's name, organization's former name or abbreviated name, the organization's city, state, country, or phone number, the organization's website, or the description of the organization;

10. Logos: Provided where the keywords match the logo's description or the organization that owns the logo;

11. People: Provided where the keywords match the person's name, the person's organization, the person's job title, the person's phone number, or the person's e-mail address;

12. Roles: Provided where the keywords match the role description, the name of the person in the role, the name of the organization whose people are in the role, or the job title, phone number, or e-mail of the person in the role;

13. Beats: Provided where the keywords match the beat description, the name of the person in the beat, the name of the organization whose people are in the beat, or the job title, phone number, or e-mail of the person in the beat;

14. Products: Provided where the keywords match the product's name, the organization that makes the product, the product's part number, or the name of the product contact person;

15. Publications: Provided where the keywords match the publication's name, the organization that publishes the publication, or the publication's description;

16. Editorial Opportunities: Provided where the keywords match the title or description of the opportunity, the name of the publication providing the opportunity, or the organization that publishes the publication;

17. Events: Provided where the keywords match the title or description of the event;

18. Articles: Provided where the keywords match the title, author, summary, or text of the article;

19. Press Releases: Provided where the keywords match the title, summary, or text of the press release;

20. White Papers: Provided where the keywords match the title, summary, or text of the white paper;

21. Awards: Provided where the keywords match the title, summary, or industry affiliated with the awards program; and 22. Categories: Provided where the keywords match the title or text of the categories. The Search Module also hyperlinks search results to more detailed information so that users can drill down to more detailed information and directly access the Gateway's Database(s) 116.

The Branding Assistant Module provides functionality for users to determine what "brands" are available to market a product or service, such as URLs, toll-free numbers, logos, patents and trademarks. The Branding Assistant Module searches key databases, such as the United States Patent and Trademark Office's Trademark Electronic Search System (TESS), to determine the general availability of a term prior to investing in a more detailed and expensive search with a third party provider of such services. By searching multiple databases, the Branding Assistant Module provides a summary of available communications paths for the brand manager in one quick setting.

Content Section

The Content Section of the Gateway provides functionality for users to control the content in the Database(s) 116 by guiding what is uploaded by users as well as downloaded by the Gateway from the Internet. All of the content-driven modules support the ability to retrieve data via the Gateway's Retriever Module or to post that data for dissemination over the Gateway's wire service. The Content Section provides organizations with control over a central repository of information that can be accessed and disseminated by a Gateway user's organization and the people the organization is trying to influence. Data can be accessed by linking to that data via the Gateway and disseminated by exporting that data to a media that can be sent throughout the Gateway or the Internet via the Messaging Module, the Presentations Module, the Retrievers Module's RSS feeds or emails, or other Gateway Modules. For example, a PR firm may locate and link to articles mentioning a client's product and output a summary of all those articles in the Content Section in an email to the client.

The Content Section utilizes sophisticated retrievers to scour the Gateway's Database(s) 116 based on parameters set by the user. For example, a user sets up a retriever with the Retrievers Module, the retriever retrieves the data, and the Gateway's spider engine updates the Gateway's Database(s) 116 based on those retrievals. This downloaded information can then be used for all sorts of purposes in the Gateway, including creating presentations via the Presentations Module. Users can also upload content including press releases, white papers, case studies, book listings, Frequently Asked Questions (FAQs) lists, glossaries, links listings, and even icons into the Database(s) 116 for easy access, dissemination, and web presentation throughout the Gateway and beyond. That information can also be uploaded to external databases, including automatically completing any payment transaction required to upload such data with the Gateway's payment engine. Uploaded content that is published is communicated to the public via the Gateway's wire service as well as to the Gateway's public directory of content that is optimized to be scraped by public search engines. Because the Database(s) 116 is parsed and various forms of Meta Data are provided for the Core Data stored on the Database(s) 116, the content-driven modules of the Content Section more efficiently locate and utilize that information in the proper context. Content that is uploaded into the Gateway can be linked to other content in the Gateway either manually or by automated analysis tools. Accordingly, logos, white papers, pictures, and other content that is applicable can be linked, for example, to a new product press release being issued so that a reporter will have more information in context when reviewing that press release about the product. Those content-driven modules include a Documents Module, a Press Releases Module, an Articles Module, a White Papers Module, a Case Studies Module, a Books Module, a Newsletters Module, a Products Module, an Icons Module, an Events Module, a Glossaries Module, a Links Module, a FAQ Lists Module, a Stats Module, an Analysts Reports Module, an Audio Module, a Video Module, and a Best In Class Module.

The Documents Module provides a central access point for all of the documents uploaded to the Gateway by an organization. Those documents include press releases, articles, white papers, case studies, books, buyer's guides, surveys, presentations, training manuals, tutorials, and any other type of content that a Gateway user's organization might want to make available to the media via the Gateway or to the public via the organization's own website. Documents uploaded in this module are available to other modules as well, so they can be incorporated in processes and/or uploaded to upstream systems, such as known white paper dissemination services. In addition, content uploaded by other modules in the Gateway is also accessible via the Documents Module where appropriate, such as press releases uploaded using the Press Releases Module. The Document Module is a central store for all documents found in the various modules in the Gateway's Content Section.

The Press Releases Module provides functionality for users to upload, store, and publish an organization's press releases to major newswires and to sites that link to the Gateway press release content, including the user's own website. The Press Releases Module includes functionality that makes positive matches with publisher classification systems, ensuring that the relevant people see the organization's press releases. It also ensures that more websites, Influencers, and other Gateway users will have access to the user's Gateway content by ensuring that the information is only uploaded, stored, and published to the relevant people. And, users can ensure they are matched, i.e., linked, with certain categories of information and therefore automatically receive press releases that are pertinent to those categories by, for example, using the Gateway Directories Module or the Organization Directories Module to link to various organization profiles. The Press Releases Module also provides a stronger keyword capability by enabling users to link to hundreds of industry specific words that better reflect the user's preferred categories.

The Press Release Module takes an unconventional and novel approach to the creation of a press release. Historically, press releases were largely a single document from beginning to end. The problem that presented for external servers and other machines consuming that content as it was published was that those servers and machines had to parse the information into its component pieces to be able to properly digest the information and put, for example, headlines in the Headlines field, the PR contact into the PR Contact field, etc. By contrast, the Press Release Module of the present invention provides functionality for PR representatives uploading press releases to parse the component pieces of press releases on the front end by placing the specific content into specific fields. Thus, when the information is published, the Gateway's wire service is able to send out both a complete single document that resembles the historical look of a press release as well as the pre-parsed out field-segmented Meta Data that makes up the release, thereby placing press releases in a format that is more consumable by servers and machines, such as public search engines. The Gateway takes a similar approach to all content by making sure Meta Data records exist for all content to make it more easily consumable by web-based servers and machines.

The Articles Module provides functionality for users to upload, store and publish articles and article references for use, for example, on that user's organization's website. In that example, users can create article retrievers based on keywords to find articles written about their organizations and then publish that information automatically to their own internal intranet website. The article reference will include the Meta Data about the article, such as, the article headline, a secondary headline, a summary of the article, a byline, the date, key quotes, keyword(s) that found the article, and even a Uniform Resource Locator (URL) hyperlink, to the article. Organizations can even rate the stories in the Articles Module for later trend analysis.

The Articles Module also provides functionality for users to post articles so that the users can freely post Meta Data concerning pertinent articles that the users want in the Gateway's Database(s) 116 that were otherwise not found in the Gateway's Database(s) 116. The Articles Module allows users to find and post special types of articles, such as reviews about their products or services. Such reviews can be grouped together per product and can form additional specific research for a user, such as a product manager who is tracking the industry's reaction to his/her product or service.

The White Papers Module provides functionality for organizations to maintain their cadre of white papers and to get those white papers in front of the readers that marketing departments covet. Accordingly, the White Papers Module allows organizations to create an on-line white paper library repository for access throughout the Gateway. Users can upload their white papers for publishing to their websites and to white paper disseminators, such as BITPIPE, MARKETRESEARCH.COM, and WEBTORIALS.COM brand document libraries. A user can also use the Gateway's retriever engine to find white papers of interest to them based on key words, track competitor white paper listings, find the latest technology white papers on key topics, etc. Accordingly, the White Papers Module provides a central access point for internal and external use of the user's white paper oriented content. One of the novel aspects of the modules in the Gateway's Content Section is their ability to maintain logical connections to where the data is placed. Thus, if a user uploads a white paper and then, nine months later, wishes to retract the white paper because the product is no longer offered, the user can easily recall the white paper using the White Papers Module's functionality. This is a unique functionality when applied across the web at large as with the present invention.

The Case Studies Module provides functionality, like the White Papers Module, for organizations to upload their case studies for publishing to their websites. The Case Studies Module is a central access point for the organization's case studies, which then can be "pushed" out, such as by the Data Schedules Module, to the user's website or key information distributors. Also similar to the White Papers Module, case studies can be replaced or recalled on demand.

The Books Module works in conjunction with key online book sellers, such as AMAZON.COM brand online book seller, to make it easy to publish and track book information in the Gateway's Database(s) 116. Using web services from the Gateway and online book sellers, the Books Module automatically interfaces with all key information on the online book sellers' databases to track rating, ranking, and pricing information to make sure that a user's book references are as current as possible. The Books Module provides functionality for the user to upload their own information into the Gateway, so the user can publish the information about the book alongside or separate from an online bookseller's listings. The Books Module is yet another means for users to track information by keyword and to obtain a complete view of any topic using the Gateway.

The Newsletter Module provides functionality for users to upload or search for e-mail-based newsletters. E-mail newsletters today go into a void because they are not generally stored in searchable locations. With the Gateway's Newsletter Module, users can sign up the Gateway to receive the e-mail newsletter and have e-mails automatically captured by the Gateway as a repository of those newsletters. Similarly, a user can upload an e-mail to the Gateway's Database(s) 116 to make that content available for the Gateway's search engine and public search engines so others can find those newsletters online. And, after a user has uploaded a newsletter into the Gateway's Database(s) 116, the user can use the Newsletter Administration Module to manage a newsletter distribution list for that newsletter and allow people to sign up for the newsletter via the user's website.

The Products Module provides functionality for organizations to selectively make otherwise internal information readily available to designated parties. Although certain product information is often kept in organization content repositories or in internal documents and is almost never openly available to the media, analyst, and other communities for inclusion in Buyer's Guides, feature stories, product directories, etc., the Products Module enables editors and analysts to download such product information for stories by merely linking to or downloading product information that has been entered by users into the Gateway's Database(s) 116. Product information, like all Content Section information, can be either manually or automatically (machine-to-machine links via the import/export engine) entered into the Gateway's Database(s) 116. Once entered into the Gateway's Database(s) 116, information is thus accessible by other parts of the Gateway. For example, the Products Module can link to and pre-populate Buyer's Guide surveys with existing product fields that match those in the product database to enable organizations to more quickly answer a majority of reporter questions before having to manually enter the remaining information. Such a re-use of information speeds up the process for product and other marketing managers to respond to reporter queries. And, organizations with content management systems can keep their product areas current by pushing relevant data to all those Influencers linked to the Gateway and who require the information by sending them the information, such as via the Data Schedules Module and the External Hosts Module. The Products Module is very attractive to reporters because it provides a central place where Influencers can gather data for several organizations at one time, thus enabling them to include more data in their stories or research projects.

Similar to the Logos Module, the Icons Module provides functionality for users to maintain more control over the use of their icons on the web. Many organizations create specialized icons for their products that are often used in graphics/presentation programs, such as MS POWERPOINT and VISIO brand graphics/presentation programs. In conjunction with, for example, the Microsoft Office Gateway Add-In Tool, the Icons Module enables a user to access an organization's icons from directly within any of the applications of the MS OFFICE brand software suite. The user can also create an Icons Library on the user's website using the Icons Module.

The Events Module provides functionality for users to push information about an event out to Influencers who have linked to the event. The Gateway of the present invention provides a novel approach to dealing with event marketing. Prior to the present invention, an event organizer would issue a press release about an event very early in the event's development to promote the event. However, as an event's plan takes shape, the event often changes dates, venue, or other key attributes. Such changes would be missed by those who had already published information about the event in the initial press release. And, if the event is cancelled, there was no means to recall the event listings except by issuing another press release, which is not desired nor 100% guaranteed to be seen by all of those Influencers who had already published data about the event. To solve such problems, the Events Module provides functionality for an event organizer to update event information at any time and have that information flow through the Gateway, the Internet, and other databases where the event was initially published. In addition, by classifying the user's event within the Gateway, the user can attract new potential attendees through the marketing and publicity opportunities within the Gateway, such as the Events Widget on the MyGateway page where other users have designated that classification of event to appear.

The Events Module provides a user with a central point of access for gathering and disseminating information about the user's events, whether they are as big as a tradeshow, or merely a one-hour Webinar/Webcast. In conjunction with the other modules of the Gateway, the Events Module can communicate the user's event information to key upcoming event listings and eventwire publishers throughout the Gateway and across the Internet. And, when using the Gateway's retriever engine, the user can also retrieve other users' event information to populate the user's website with upcoming event information.

The Glossaries Module provides functionality for users to enter and maintain a glossary of key information on the user's website. Using a simple and intuitive interface, a user can enter his/her terms, abbreviations, definitions, URL links, diagrams and other information to create and maintain, in a single or multi-user fashion, a listing of terms for the user's website and those linked to the user's website, such as an organization's channel partners. Once stored in the Gateway's Database(s) 116, the user's glossary can be published to anyone the user has given permission to link to that data. The user can also use the Gateway's retriever engine to track definitions on other glossary sites so the user can create a metaGlossary of information contained on other sites, with links to those other sites for more detailed definitions. In that manner, an organization associated with a particular technology can track web-based glossary definitions for that particular technology, both to see glossaries where the technology is not mentioned and to review and potentially correct glossaries where the technology is mentioned. No such functionality existed prior to the present invention.

The Links Module provides functionality for users to maintain links listings on their websites. A user can enter and view key information, such as partners and distributors, by simply entering the URL that identifies the location of that information into the Links Module, and the Presentations Module will automatically process and publish the URLs to a list on the user's website. The Links Module, like many of the Gateway's other modules, can also be accessed by any other user to whom the user grants access, enabling the user to centrally manage information with the user's partners or distributors and for the user's partners or distributors to automatically link content to the user's website.

The FAQ Lists Module provides functionality for users to maintain and access a FAQ of key information that users wish to communicate to other users. Managing FAQ lists on a user's website can be administratively difficult, particularly if multiple people have to help maintain them. Utilizing the Gateway's retriever engine, the FAQ Lists Module allows users to create virtual FAQs based on other organizations' FAQ lists such that the FAQ Lists Module will link the question and associated URL for the answer so that users are sent to the originating site for more details when they click on the question, which enables the creation of meta-FAQ lists. The specific capability to combine FAQs is unique to the present invention.

The Stats Module provides functionality for users to upload their industry and other pertinent statistics into the Gateway's Database(s) 116 where those statistics are accessible and can be pushed out to those who track such industry content, for example via retrievers' RSS feeds or the Gateway's wire service. The Stats Module provides functionality for users to retrieve and group statistics for inclusion in analyst reports by industry analysts or news stories by reporters. The statistics can also be uploaded to various Internet databases that track such statistics, providing a wider audience to the statistics.

The Analyst Reports Module provides functionality for users to upload their analyst reports into the Gateway's Database(s) 116 where those reports are accessible and can be pushed out to reports listing services via, for example, the External Hosts Module. The Analyst Reports Module provides functionality for users to retrieve and group analyst reports for competitive tracking and information gathering. Analyst Reports can be linked, for example, to statistics and press releases to better provide relevant information for external listing services to make available to potential buyers and to better market the reports. The Analyst Reports Module also provides functionality for users to make full text analyst reports available via special permissions, such as to select reporters, via a permissions control mechanism in the module.

The Audio Module and the Video Module each provide functionality, respectively, for users to place audio and video data on the Gateway's Database(s) 116. Each respective module assigns audio or video Meta Data so that the data can be searched more easily using, for example, the Search Module. Each respective module also provides functionality for users to upload audio or video data from the Gateway to sites such as the ITUNES brand audio site or the YOUTUBE brand video site.

The Best in Class Module provides functionality for users to create a Best In Class dataset by applying selective filtering to organizations and their products in a particular category. For example, a product manager creating a new product might wish to simultaneously meet the optimal capabilities from a number of products or services. Users can use the Best In Class Module to create a matrix of the relevant products or services and check those product or service responses that constitute the Best In Class of the offerings as a group. The user can then display the Best In Class products or services in a matrix with the user's product or service offerings to show how the Best In Class product or service compares. No such functionality existed prior to the present invention.

Workflow Section

The Workflow Section of the Gateway provides functionality for a user to control the flow of data throughout the Gateway. Workflow routines are executed by the Server(s) 114 to automate process-specific activities, such as causing the Router(s) 118 to automatically transfer data, based on certain triggering events, e.g., a user modifying that data on the Database(s) 116. The workflows of the present invention automate such activities by establishing the role that each user takes in a process and allowing a document to be processed and moved from one status to another according to a set of rules. In addition, the workflows of the present invention can be employed by a user for automating e-commerce, such as electronic billing. The workflows can be used once for a specific purpose, or left ongoing for continual entry and updating of information. And, the ability of the Gateway to build and maintain relationships between users, roles, and companies allows a workflow to become a social networking tool for the purpose of the workflow. Users of the Gateway are prompted to take part in workflows that might be of interest to them based on activities they have taken part in previously and/or topics they have noted that are of interest to them. In addition, workflows reach out on a regular basis via e-mail and other alerts to make sure users are still involved in the topic area of the workflow and are still interested in taking part in the workflow. Workflows also track roles and relationships within the workflows to enable users to see, for example, what other users in their organization are doing in the same workflow and to invite others to take part in the workflow. Accordingly, co-workers and PR firm/clients can work together on the same workflows to common goals.

The Gateway's workflow engine includes the routines that provide a shared set of workflow functionality applied to the Gateway's workflow-driven modules. An exemplary embodiment of those routines according to the present invention is provided in File Nos. 1-7 of the Computer Program Listing Appendix incorporated herein by reference. By separating the logic into a separate set of code in the workflow engine instead of in the individual workflow-driven modules, each workflow-driven module shares the same basic logic, which provides a consistent and robust set of functionality for each workflow-driven module and allows the performance of all of those modules to be optimized by merely modifying the underlying code.

Among the functionality provided by the workflow engine that may be utilized by the workflow-driven modules are functionality for choosing from predefined definitions of the preferences, rules, and display parameters for defining a workflow for completing a task; functionality for creating and storing various forms and templates used within the workflow; functionality for storing the information regarding the individuals and/or organizations participating in the task for which the workflow is provided; functionality for storing problem/response records generated during the workflow; functionality to track the status of tasks, by individual user/participant, to be performed during the workflow, such as whether a specific user participant has completed a specific form; functionality to view, edit, update, and delete information stored as part of the workflow; and functionality to perform certain operations that all of the workflow-driven modules provide, such as sending an e-mail to a group of contacts, registering users, or reporting on specific activities in the workflow through reports in the workflow. The Gateway's workflow engine also provides functionality for a workflow administrator to brand the look and feel of the user experience with their workflow process by uploading banners, custom style sheets, headers, footers, and other images that can be used in emails and web-based participating user interfaces.

The various functionalities of the workflow engine are accomplished by providing a pre-defined data set of entities and components for interacting with the scripting language of a user interface, such as a web page. The entities are stored in the Gateway's Database(s) 116 and include the following:

1. Workflow: An instance of an individual workflow. Attributes include Workflow ID, Name, Type of Workflow, Preference Record ID, Response User Interface (UI) Style Sheet, Response UI Header, and Response UI Footer.

2. Workflow Company: Identifies each organization that is participating in the workflow. Attributes include the Workflow ID, Organization Record ID, and Pre-approved Status.

3. WorkflowCompanyRole: Identifies each organization's role within the workflow. Attributes include the Organization ID, Role ID, Status ID, and Percent Complete.

4. WorkflowContact: Identifies each individual participating within the workflow. Attributes include the Workflow ID, User Record ID, Organization Record ID, Pre-approved Status, and Registered Status.

5. WorkflowContact: Identifies each contact's role within the workflow. Attributes include the Contact ID, Role ID, Status ID, Role Type, Percent Complete, and Invitation GUID (Globally Unique Identifier).

6. WorkflowE-mail: Defines each e-mail used within a workflow with a link to the Gateway's messaging engine. Attributes include the Workflow ID, E-mail ID, Sequence Number, Type ID, Role ID, Method ID, From Type ID, Attachments, and Enabled Status.

7. WorkflowE-mailFromType: Defines each "from" type for e-mails (primary administrator, secondary administrator). Attributes include From Type ID and Name.

8. WorkflowE-mailMethod: Defines each sending method for e-mails (automatic, manual). Attributes include Method ID and Name.

9. WorkflowE-mailType: Defines each e-mail type. Attributes include Type ID and Name.

10. WorkflowForm: Identifies each form (document type) used within a workflow, with a link to the Gateway's forms engine. Attributes include Workflow ID, Form ID, and Type ID.

11. WorkflowFormPermission: Specifies the permission (or access) that users have to instances of forms within a workflow. Attributes include Owner ID, Type ID, End Date, Comments, and Granted Status.

12. WorkflowFormType: Defines each form type. Attributes include Type ID and Name.

13. WorkflowImage: Identifies images, such as logos, that are used within the workflow response process. Attributes include Workflow ID, Type ID, Name, Format, and Media ID.

14. WorkflowProblem: Identifies each problem reported about a document in a workflow. Attributes include Document ID, Category ID, Type ID, New Category ID, Reason, Date, Status ID.

15. WorkflowProblemResponse: Identifies each response to a reported problem. Attributes include Problem ID, Answer, Comments, and Date.

16. WorkflowProblemStatus: Defines the problem status type. Attributes include Status ID and Description.

17. WorkflowPublication: Identifies publications associated with a workflow. Attributes include Workflow ID, Publication Record ID, and Pre-approved Status.

18. WorkflowRole: Defines each role type. Attributes include Role ID, Name, and Workflow Type ID.

19. WorkflowRounds: Identifies each round for workflows that support multiple rounds, such as that utilized by the Awards Module. Attributes include Name, Role ID, Rounds, and Sequence Number.

20. WorkflowStatus: Defines each type of status for organizations and contacts. Attributes include Workflow Type ID, Name, Sequence Number.

21. WorkflowStatusChange: Defines rules for how statuses change. Attributes include Status ID, Form Type ID, Form Action, Old Status, and New Status.

22. WorkflowType: Defines type of workflow. Attributes include Type ID, Name, and Preference Table ID, Response UI URL, and Admin UI URL.

23. WorkflowTypeE-mail: Defines the default e-mails for each workflow type. Attributes include Workflow Type ID, E-mail ID, Sequence Number, Type ID, Role ID, Method ID, and From Type ID.

24. WorkflowTypeForm: Defines the default forms for each workflow type. Attributes include Workflow Type ID, Form ID, and Type ID. The components contain the programming logic that interacts with the scripting language of the user interface, such as a web page, and include the following functions:

1. mBWorkflow.CInternal.Add: Adds a workflow record.

2. mBWorkflow.CInternal.AddE-mail: Adds an e-mail record.

3. mBWorkflow.CInternal.AddStatus: Adds a status record.

4. mBWorkflow.CInternal.AddStatusChange: Adds a status change record.

5. mBWorkflow.CInternal.Delete: Deletes a workflow record.

6. mBWorkflow.CInternal.DeleteE-mail: Deletes an e-mail record.

7. mBWorkflow.CInternal.DeleteStatus: Deletes a status record.

8. mBWorkflow.CInternal.DeleteStatusChange: Deletes a status change record.

9. mBWorkflow.CInternal.Fetch: Fetches a workflow record.

10. mBWorkflow.CInternal.FetchE-mail: Fetches an e-mail record.

11. mBWorkflow.CInternal.FetchE-mails: Fetches e-mail records.

12. mBWorkflow.CInternal.FetchRoles: Fetches roles records.
13. mBWorkflow.CInternal.FetchRoleNameByAdminLevel: Fetches role name based on admin level.
14. mBWorkflow.CInternal.FetchStatus: Fetches a status record.
15. mBWorkflow.CInternal.FetchStatusChange_IngStatusChangeID: Fetches a status change record.
16. mBWorkflow.CInternal.FetchStatusChanges: Fetches status change records.
17. mBWorkflow.CInternal.FetchStatuses: Fetches status records.
18. mBWorkflow.CInternal.FetchWorkflows: Fetches workflow records.
19. mBWorkflow.CInternal.FetchWorkflowsByCoID: Fetches workflow records for a company.
20. mBWorkflow.CInternal.FetchWorkflowsByContact: Fetches workflow records for a contact.
21. mBWorkflow.CInternal.FetchWorkflowsCommentsByCoID: Fetches comments for a company.
22. mBWorkflow.CInternal.FetchWorkflowsCommunicationsByContact: Fetches e-mails for a contact.
23. mBWorkflow.CInternal.FetchWorkflowsContactsByCoID: Fetches contacts for a Company.
24. mBWorkflow.CInternal.FetchWorkflowsDataByCoID: Fetches documents for a company.
25. mBWorkflow.CInternal.Update: Updates a workflow record.
26. mBWorkflow.CInternal.UpdateE-mail: Updates an e-mail record.
27. mBWorkflow.CInternal.UpdateStatus: Updates a status record.
28. mBWorkflow.CInternal.UpdateRoles: Updates a role record.
29. mBWorkflow.CInternal.UpdateStatusChange: Updates a status change record.
30. mBWorkflow.CWorkflow.Add: Add a workflow record.
31. mBWorkflow.CWorkflow.AddE-mail: Add an e-mail record.
32. mBWorkflow.CWorkflow.Copy: Copies a workflow record.
33. mBWorkflow.CWorkflow.CopyE-mails: Copies workflow e-mail records.
34. mBWorkflow.CWorkflow.Delete: Deletes a workflow record.
35. mBWorkflow.CWorkflow.DeleteCompany: Deletes a company record.
36. mBWorkflow.CWorkflow.DeleteContact: Deletes a contact record.
37. mBWorkflow.CWorkflow.DeleteImage: Deletes an image record.
38. mBWorkflow.CWorkflow.DeletePublication: Deletes a publication record.
39. mBWorkflow.CWorkflow.Fetch: Fetches a workflow record.
40. mBWorkflow.CWorkflow.FetchByGUID: Fetches a workflow record by GUID.
41. mBWorkflow.CWorkflow.FetchCompanies: Fetches company records.
42. mBWorkflow.CWorkflow.FetchCompaniesPreapproved: Fetches company records by pre-approved status.
43. mBWorkflow.CWorkflow.FetchCompany: Fetches a company record.
44. mBWorkflow.CWorkflow.FetchCompanyPermission: Fetches a company's permission for a form type ID.
45. mBWorkflow.CWorkflow.FetchCompanyPermissions: Fetches a company's permissions for forms.
46. mBWorkflow.CWorkflow.FetchContact: Fetches a contact record.
47. mBWorkflow.CWorkflow.FetchContactByContactID: Fetches a contact record by contact ID.
48. mBWorkflow.CWorkflow.FetchContactByE-mail: Fetches a contact record by e-mail address.
49. mBWorkflow.CWorkflow.FetchContactByGUID: Fetches a contact record by GUID.
50. mBWorkflow.CWorkflow.FetchContactPermission: Fetches a contact's permission for a form type ID.
51. mBWorkflow.CWorkflow.FetchContactPermissions: Fetches a contact's permissions for forms.
52. mBWorkflow.CWorkflow.FetchContacts: Fetches contact records.
53. mBWorkflow.CWorkflow.FetchContactsPreapproved: Fetches contact records by pre-approved status.
54. mBWorkflow.CWorkflow.FetchE-mail: Fetches an e-mail record.
55. mBWorkflow.CWorkflow.FetchE-mailFromTypes: Fetches e-mail "from type" records.
56. mBWorkflow.CWorkflow.FetchE-mails: Fetches e-mail records.
57. mBWorkflow.CWorkflow.FetchE-mailsHistory: Fetches e-mail history records.
58. mBWorkflow.CWorkflow.FetchE-mailMethods: Fetches e-mail "method type" records.
59. mBWorkflow.CWorkflow.FetchE-mailTypes: Fetches e-mail "type" records.
60. mBWorkflow.CWorkflow.FetchImage: Fetches an image record.
61. mBWorkflow.CWorkflow.FetchImageByMediaID: Fetches an image record by media ID.
62. mBWorkflow.CWorkflow.FetchImagesByWorkflowID: Fetches images records by workflow ID.
63. mBWorkflow.CWorkflow.FetchPublication: Fetches a publication record.
64. mBWorkflow.CWorkflow.FetchPublicationsPreapproved: Fetches publications by pre-approved status.
65. mBWorkflow.CWorkflow.FetchStatusByForm: Fetches workflow status records by form type ID.
66. mBWorkflow.CWorkflow.FetchWorkflowsByTypeID: Fetches workflow records by type ID.
67. mBWorkflow.CWorkflow.FetchWorkflowType: Fetches a type record.
68. mBWorkflow.CWorkflow.FetchWorkflowTypes: Fetches type records.
69. mBWorkflow.CWorkflow.FetchWorkflowFormType: Fetches a form type record.
70. mBWorkflow.CWorkflow.InsertCompany: Adds a company record.
71. mBWorkflow.CWorkflow.InsertContact: Adds a contact record.
72. mBWorkflow.CWorkflow.InsertForm: Adds a form record.
73. mBWorkflow.CWorkflow.InsertForms: Adds form records.
74. mBWorkflow.CWorkflow.InsertImage: Adds an image record.
75. mBWorkflow.CWorkflow.InsertPublication: Adds a publication record.
76. mBWorkflow.CWorkflow.Register: Registers a user.
77. mBWorkflow.CWorkflow.Revalidate: Re-validates a user.
78. mBWorkflow.CWorkflow.SearchCompanyByClassification: Searches for a company based upon classification.

79. mBWorkflow.CWorkflow.Update: Updates a workflow.

80. mBWorkflow.CWorkflow.UpdateCompanyPercentComplete: Updates percent complete for a company record.

81. mBWorkflow.CWorkflow.UpdateCompanyPermission: Updates permissions for a company.

82. mBWorkflow.CWorkflow.UpdateContactPermissionComments: Updates comments for a contact permission record.

83. mBWorkflow.CWorkflow.UpdateCompanyPreapproved: Updates pre-approved status for a company record.

84. mBWorkflow.CWorkflow.UpdateCompanyStatus: Updates status for a company record.

85. mBWorkflow.CWorkflow.UpdateContact: Updates a contact record.

86. mBWorkflow.CWorkflow.UpdateContactPermission: Updates permissions for a contact.

87. mBWorkflow.CWorkflow.UpdateContactPreapproved: Updates pre-approved status for a contact record.

88. mBWorkflow.CWorkflow.UpdateContactStatus: Updates status for a contact record.

89. mBWorkflow.CWorkflow.UpdateE-mail: Updates an e-mail record.

90. mBWorkflow.CWorkflow.UpdateE-mailTemplate: Updates an e-mail template record.

91. mBWorkflow.CWorkflow.UpdateImage: Updates an e-mail record.

92. mBWorkflow.CWorkflow.UpdatePublicationPreapproved: Update pre-approved status for a publication record.

93. mBWorkflow.CWorkflow.UpdateWorkflowContactRegistered: Update contact registered with workflow.

94. mBWorkflow.CWorkflow.Validate: Validates a user after registration.

95. mBWorkflow.CWorkflowEmail.AddEmail: Adds an email.

96. mBWorkflow.CWorkflowEmail.DeleteEmail: Deletes an email.

97. mBWorkflow.CWorkflowEmail.FetchEmail: Fetches an email.

98. mBWorkflow.CWorkflowEmail.FetchEmailByType: Fetches an email by email type.

99. mBWorkflow.CWorkflowEmail.FetchEmailHistory: Fetches all email history for a workflow.

100. mBWorkflow.CWorkflowEmail.FetchEmailHistoryByName: Fetches email history by recipient name.

101. mBWorkflow.CWorkflowEmail.FetchEmailHistorySearch: Searches email history.

102. mBWorkflow.CWorkflowEmail.FetchEmails: Fetches emails for a workflow.

103. mBWorkflow.CWorkflowEmail.InsertEmails: Inserts default emails for a workflow.

104. mBWorkflow.CWorkflowEmail.UpdateEmail: Updates an email. Exemplary embodiments of routines of the present invention that implement those component functions are provided in File Nos. 1-4 of the Computer Program Listing Appendix incorporated herein by reference. Where the scripting language is the MICROSOFT (MS) brand Active Server Pages (ASP) server-side scripting language for dynamically generated web pages, the present invention provides the following class functions:

1. cWorkflow.Add: Adds a workflow record.
2. cWorkflow.Delete: Deletes a workflow record.
3. cWorkflow.DeleteCompany: Deletes a company record.
4. cWorkflow.DeleteContact: Deletes a contact record.
5. cWorkflow.Fetch: Fetches a workflow record.
6. cWorkflow.FetchByGUID: Fetches a workflow record by GUID.
7. cWorkflow.FetchCompany: Fetches a company record.
8. cWorkflow.FetchCompanies: Fetches company records.
9. cWorkflow.FetchContact: Fetches a contact record.
10. cWorkflow.FetchContactByContactID: Fetches a contact record by Contact ID.
11. cWorkflow.FetchContactByEmail: Fetches a contact record by email address.
12. cWorkflow.FetchContactByGUID: Fetches a contact record by GUID.
13. cWorkflow.FetchContacts: Fetches contact records.
14. cWorkflow.FetchPublication: Fetches a publication record.
15. cWorkflow.InsertCompany: Adds a company record.
16. cWorkflow.InsertPublication: Adds a publication record.
17. cWorkflow.InsertContact: Inserts a publication record.
18. cWorkflow.Update: Updates a workflow record.
19. cWorkflow.UpdateContact: Updates a contact record.
20. cWorkflow.UpdateContactStatus: Updates status in a contact record.
21. cWorkflowEmail.Add: Adds an email record.
22. cWorkflowEmail.Fetch: Fetches an email record.
23. cWorkflowEmail.FetchEmails: Fetches email records.
24. cWorkflowEmail.FetchFromTypes: Fetches "from type" records.
25. cWorkflowEmail.FetchHistory: Fetches history records.
26. cWorkflowEmail.FetchMethods: Fetches "method type" records.
27. cWorkflowEmail.FetchTypes: Fetches "email type" records.
28. cWorkflowEmail.GetEmailVariables: Gets variables for an email.
29. cWorkflowEmail.GetEmailVariablesDescription: Gets description of variables for an email.
30. cWorkflowEmail.GetParameterNames: Gets parameter names from email variables.
31. cWorkflowEmail.GetParameters: Gets parameters for an email.
32. cWorkflowEmail.GetRecipients: Gets recipients for an email.
33. cWorkflowEmail.ReplaceBodyParams: Replaces variables with parameter values in email HTML body.
34. cWorkflowEmail.ReplaceTextParams: Replaces variables with parameter names in email text body.
35. cWorkflowEmail.Send: Sends an email.
36. cWorkflowEmail.SendCustom: Sends a custom email.
37. cWorkflowEmail.Update: Update an email record.
38. cWorkflowDisplay.CompanyActions: Processes company form actions.
39. cWorkflowDisplay.CompanyData: Setup UI for company form.
40. cWorkflowDisplay.CompanyDisplay: Displays company form.
41. cWorkflowDisplay.CompanyListActions: Processes company list actions.
42. cWorkflowDisplay.CompanyListData: Setup UI for company list.
43. cWorkflowDisplay.CompanyListDisplay: Displays company list.
44. cWorkflowDisplay.ContactActions: Processes contact form actions.
45. cWorkflowDisplay.ContactData: Setup UI for contact form.

46. cWorkflowDisplay.ContactDisplay: Displays contact form.

47. cWorkflowDisplay.ContactListActions: Processes contact list actions.

48. cWorkflowDisplay.ContactListData: Setup UI for contact list.

49. cWorkflowDisplay.ContactListDisplay: Displays contact list.

50. cWorkflowDisplay.EmailActions: Processes email form actions.

51. cWorkflowDisplay.EmailData: Setup UI for email form.

52. cWorkflowDisplay.EmailDisplay: Displays email form.

53. cWorkflowDisplay.EmailListActions: Processes email list actions.

54. cWorkflowDisplay.EmailListData: Setup UI for email list.

55. cWorkflowDisplay.EmailListDisplay: Displays email list.

56. cWorkflowDisplay.FormListData: Setup UI for form list.

57. cWorkflowDisplay.FormListDisplay: Displays form list. An exemplary embodiment of a routine of the present invention that implements those class functions are provided in File No. 8 of the Computer Program Listing Appendix incorporated herein by reference. Together, the entities, components, and the scripting language facilitate user interaction with the workflow engine via a user interface, such as a web page.

The workflow engine also provides three distinct types of user interface: a workflow administrator interface, a participating user interface, and a Gateway Provider Administrator Interface. The workflow administrator interface provides functionality for the user who is the administrator of the workflow to define the workflow's preferences, rules, and display parameters as well as perform the administrative role in the workflow by communicating with other users participating in the workflow and working with the workflow's forms. The participating user interface provides functionality for the users participating in the workflow to respond communications from the workflow administrator and to perform the functions required by their role, such as completing and submitting various forms. And, the Gateway Provider Administrator interface provides functionality for a Gateway Provider Administrator to configure the workflow engine and its pre-defined routines. Accordingly, the workflow engine provides functionality for a utilizing an existing workflow or customizing a workflow for automating the completion of a task performed by a workflow-driven module. The workflow-driven modules include a Media Credentialing, an Event Relations Module, an Awards Module, a Member Relations Module, a Legal Relations Module, a Prospects Module, a Market Presence Module, a Buyer's Guides Module, a Surveys Module, a Gateway Directories Module, a User Tasks Module, and a Gateway Challenge/Response Module.

Industry tradeshows are a popular way for Sellers to present their current and future products and services to Buyers and Influencers. When members of the press, including reporters, editors, and industry analysts (hereinafter referred to as the "media") attend a tradeshow, they are typically able to attend using a Press Pass, without paying registration fees, in exchange for their media coverage of the show. Before attending, the tradeshow organizers employ a credentialing process to determine that parties are authentic members of the press, and that those parties are likely to provide appropriate coverage for the show. Shows sometimes have a limited number of Press Passes, which is often determined by the size of the pressroom and the stature or exclusiveness of the event. The tradeshow may also limit the number of people from one media outlet.

The media credentialing process is a manually intensive process for all involved. For example, members of the media must fill out and submit an application, as well as some or all of the following items to establish their credentials: a copy of their business card, a photograph, a copy of the masthead on which they appear, a letter from their editor stating they are on assignment from the publication to visit the tradeshow, and a list of recent articles they have written on topics relevant to the show. Each show asks for similar information from the reporters. In addition, tradeshow organizers must validate and check that information in order to determine the authenticity of the provided credentials. If the tradeshow is making a limited number of press passes available, then the applicants have to be ranked and rated, which can be a difficult process, especially when the applications are submitted over a long period of time. And, tradeshow organizers often have to communicate with the members of the media to follow up on information not provided or on information that needs to be clarified or corrected.

Accordingly, the Media Credentialing Module provides functionality for more efficiently establishing the credentials of members of the media by automating the credentialing process. The Media Credentialing Module streamlines the entire credentialing process by providing functionality for members of the media to easily create and submit applications; for show organizers to easily to review, validate, and rank applicants, or even automatically validate applicants if desired by the event organizer; and for maintaining and managing media relationships before, during and after show. An exemplary embodiment of the routines of the present invention that provide the functionality for the Media Credentialing Module is provided in File Nos. 9-142 of the Computer Program Listing Appendix incorporated herein by reference.

Figure 5A:
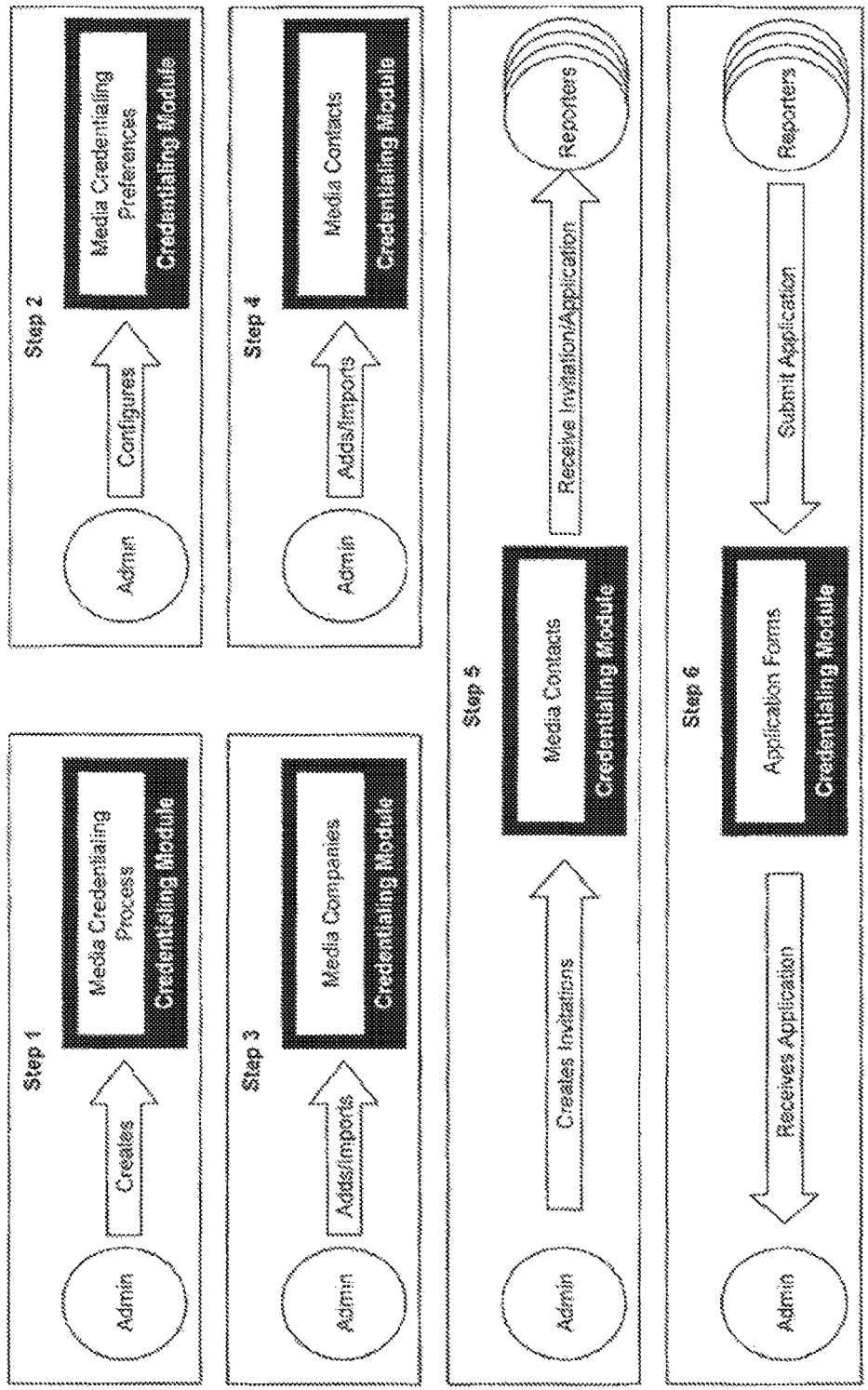
Figure 5B:
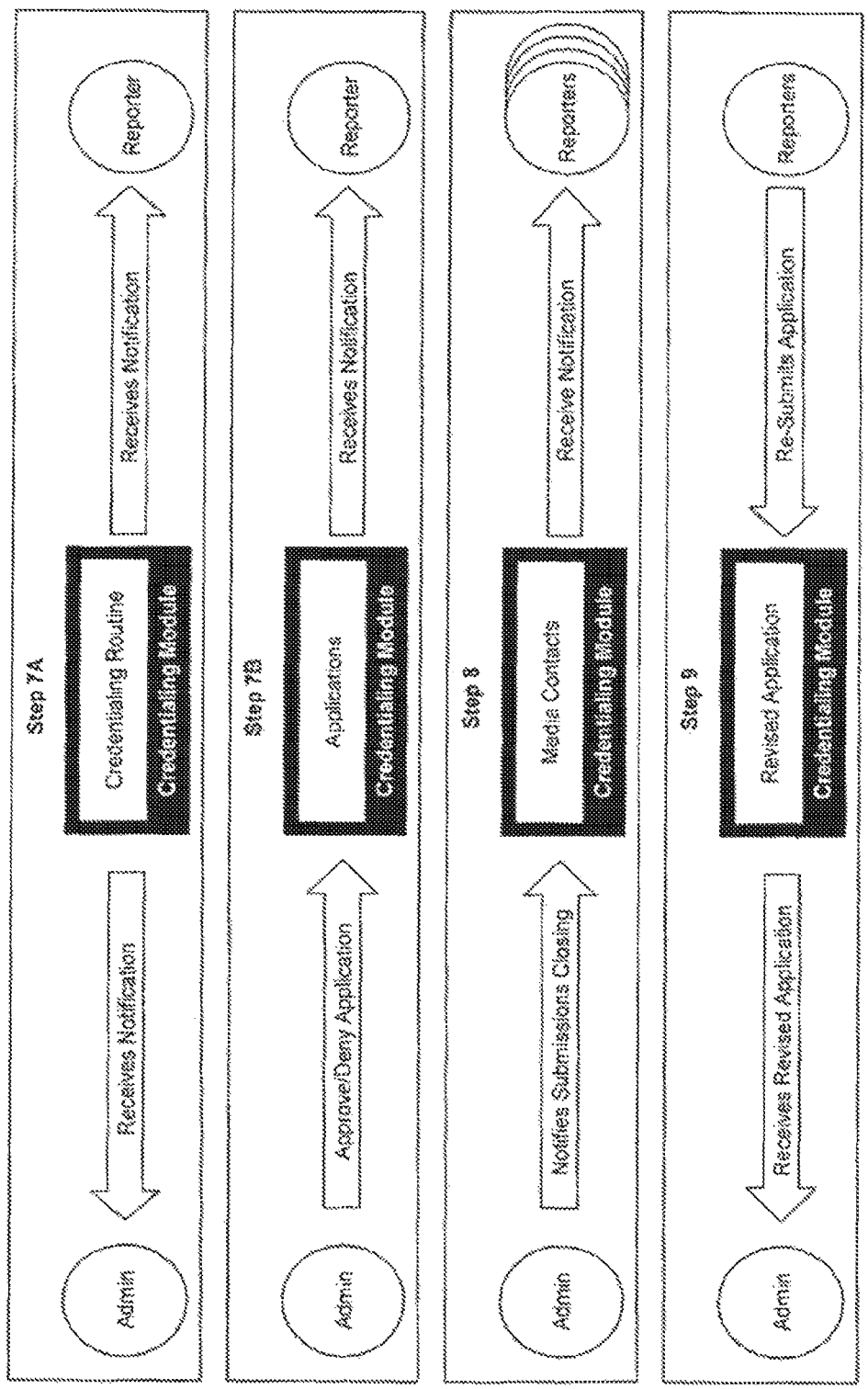

The Media Credentialing Module can structure data flow between media members and tradeshow organizers according to any number of pre-defined workflows. For example, as illustrated in FIGS. 5A-5C, the Media Credentialing Module of the present invention may include the following workflow:

Step 1: A user managing the administration of credentials for a tradeshow to members of the media (hereinafter referred to as the "Admin") creates a new media credentialing process in the Credentialing Module.

Step 2: The Admin configures the process by setting the preferences for the credentialing process in the Credentialing Module. Those preferences include the credentialing rules, the text used in the media credentialing screens, what parts of the media credentialing process will be used, how the parts of the media credentialing process will operate, what information will be required on the application forms, how the applications will be evaluated, and the dates and schedule for the media credentialing process. The Credentialing Module will also create an external link that will allow individuals that wish to participate in the credentialing process to be included by merely clicking on the link.

Step 3: The Admin identifies companies that will participate in the media credentialing process and imports, creates, or links those companies' records into the Credentialing Module.

Step 4: The Admin identifies individuals that will participate in the media credentialing process and imports, creates, or links those peoples' records into the Credentialing Module.

Step 5: The Admin creates invitations in the Credentialing Module that inform other users, e.g., Reporters, about the tradeshow and invite those users to apply for credentials for the tradeshow, and the Credentialing Module automatically sends those invitations and applications to the companies and individuals identified in Steps 3 and 4. The Credentialing Module also auto-populates at least a portion of the applications using the media profiles imported, created, or linked with the corresponding company's or individual's records, or as sent into the Gateway by external event registration or other systems.

Step 6: The Reporters fill out the applications and submit them via the Credentialing Module. The Admin receives each application or a notification as each application is submitted. The Credentialing Module can be set up to automatically transfer the applications to the Admin after the close of the submission period, on a rolling basis as they are submitted, or as manually prompted by the Admin. The Credentialing Module will notify each Reporter whether his/her application was successfully submitted, and if denied, a reason for the rejection.

Step 7A: If the Admin set the preference in the Credentialing Module to perform automatic credentialing, then the Credentialing Module will execute a credentialing routine after an application is submitted and will automatically determine whether the application is approved, denied, or requires further review based on a set of predetermined rules. The Admin and Reporter are each notified about the results of the automatic credentialing, i.e., whether the application was approved or denied.

Step 7B: If the Admin set the preference in the Credentialing Module to require the Admin's approval, the Admin must review each application and either approve or deny it. The Reporter automatically receives notification when his/her application is approved or denied by the Admin.

Step 8: Before the end of the submission period, the Admin uses the Credentialing Module to deliver a notification to the reporters, to remind them that the submission period will end soon.

Step 9: After an application has been denied, the reporter may choose to revise or complete information on the application form, and resubmit it.

Step 10: After the close of the submission period, the Admin uses the Credentialing Module to deliver a notification to the reporters, to inform them that the submission period has closed.

Step 11: Before the tradeshow begins, the Admin imports, creates, or links the final details about show attendance and press passes to the Credentialing Module and the Credentialing Module delivers that information to the approved Reporters.

Step 12: The Admin uses the Credentialing Module to export the information gathered by the credentialing process for approved members of the media, and imports it into the Admin's registration software. And, via the workflow engine, a user may modify the workflow in the Media Credentialing Module by, for example, combining the Steps 5 and 11 so that when an application is accepted, the approved Reporter automatically receives notice of the approval as well as details about show attendance and press passes. Or, the user can create his/her own workflow for the media credentialing process with the workflow engine. Such exemplary functionality is provided for each of the workflow-driven modules.

The Media Credentialing Module also utilizes the other functionalities of the Gateway to streamline and automate the media credentialing process. For example, the Organization Profiles Module and Personal Profiles Module can be utilized to create a page that is designed for media applications and allows a member of the media to maintain a profile view of organizations and other tradeshow participants. Such profiles include information such as the best time and method to contact the reporter, communications preferences, etc. That information can be used and re-used every time a press member applies to a tradeshow via the Media Credentialing Module, which simplifies the process and saves the reporter time.

Because the Gateway can receive content feeds from major publisher and analyst organizations, the Media Credentialing Module can find a reporter's article history and perform keyword search analysis to determine if that reporter has previously written articles that are appropriate for the tradeshow's main topic areas. Similarly, the Media Credentialing Module can use the Gateway's functionality to analyze books and other content areas to find content that the reporter has produced that is applicable to the tradeshow. The Media Credentialing Module utilizes analytics software to analyze and extract information from articles, books, and other content a specific reporter has produced.

The Media Credentialing Module includes "entity extraction" functionality to derives the names of people, companies, places, dates and times, and other entities; "relationship extraction" functionality to determine the relationships between entities, such as which the organization for whom a person works; "sentiment analysis" functionality to determine the a specific reporter's attitude toward a topic or entity (positive, negative, or neutral); "summarization" functionality to creates summaries for each article, book, and other documents authored by a specific reporter; and "topic extraction" functionality to determine what topics are actually discussed in the text of those documents. The Media Credentialing Module's "topic extraction" functionality is also known as "thematic extraction" or "concept extraction." These functionalities of the Media Credentialing Module can be applied to the large corpus of articles gathered from the Internet by the Gateway's spider engine to identify and organize those articles based on relevance to a topic and the author's attitude toward that topic, providing a summary of each article. Accordingly, the Media Credentialing Module makes it easier for an organization to identify those reporters the organization wants to invite to a trade show. Such functionality can be utilized, for example, before Steps 4 and 5 of the exemplary workflow provided above.

For event organizers, the Media Credentialing Module provides functionality for a party organizing a trade show to provide a set of example documents that the organizer feels best represents the topics of their event. The Media Credentialing Module performs topic extraction on those documents and then uses those topics to identify and organize articles as described. The relevancy score for each article will therefore be based on how close the topic of each retrieved article is to the topic of the articles provided by the organization. Keywords and the names of an organization's sponsor/exhibitor companies and sponsor/exhibitor's products can also be utilized to determine an article's relevance. The Media Credentialing Module also includes functionality for using the same analytics software on the event organizer's website to properly categorize the keyword content of the organizer's site so the event organizer can further optimize the matching of the media to the event.

Utilizing the Gateway's workflow and notification functionalities, the Media Credentialing Module allows for automated and manual back-and-forth communications with all participants. The Media Credentialing Module can replace fax, telephone, overnight express, and other communications means with an e-mail-driven, web-based application designed specifically for media credentialing. By providing a process that is used by many tradeshow organizers, reporters experience a consistent interface that allows them to establish a media profile, update it easily over time, and use it to apply quickly for many different shows. The Media Credentialing Module enables an ongoing relationship between the tradeshow organizers and the members of the media by automatically contacting members of the media on a regular basis, for example, via e-mail every 90 days, to ask those members of the media to update and/or confirm their media profile information.

Because the Gateway's export engine supports many types of data formats, a tradeshow organizer can use the Media Credentialing Module to export results from the credentialing process into substantially any event registration system. The Media Credentialing Module provides a front-end validation/acceptance process for any event's registration process. Although the Media Credentialing Module is not intended as a replacement for event registration software, it can apply e-commerce (a charge via credit cards) to any part of the process. While fees are not typically involved in the media credentialing process, the module does have the capability to apply fees if desired, either before an application is submitted, or after an application is accepted and approved. The Media Credentialing Module can also be slotted in-process of the registration engine, taking information entered into the registration process, performing analysis on that reporter's information, and then handing the results back to the registration process.

The Media Credentialing module also provides functionality for a tradeshow's organizer to set up rules that govern automatic credentialing. Those Rules can include any or all of the following:

58. Third Party Credentials: An organization external to the tradeshow organizer provides press accreditation for the individuals who apply to the show. The third party typically has its own methods for establishing credentials, and is known as a trusted source.

59. Article Coverage: The Gateway analyzes articles written by the applicant within a specified period prior to the current date and checks the relevancy of those articles to the topics covered by the tradeshow.

60. Prior Credentials: When an applicant has received press credentials in a previous media credentialing process via the Media Credentialing Module and has not changed their media affiliations, they can be automatically granted credentials for the current process.

61. Manual Review: The tradeshow organizer can require that all applicants receive a manual review by the administrator after the automated rules are applied, as a final check.

Accordingly, the Media Credentialing Module can be configured to handle many variations of the credentialing process. For example, preferences can be set to either allow the organizer to manually review and approve applications, or to let the system automatically certify members of the media based on set rules. The Preferences settings can also be set to auto-credential selected specific people, publications, or companies. Preference settings within the Media Credentialing Module control the look and feel of the module, the text used on pages, dates and schedules, design of the forms, and many other things.

The Media Credentialing Module facilitates bidirectional, relationship-oriented communication between tradeshow organizer's and members of the media. Before the tradeshow, the Media Credentialing Module simplifies and optimizes the process of submitting an application (for the member of the media) and evaluating and approving an application (for the organizer). During the show, the module can be used to track the articles created by the members of the media attending the show in real time. The Media Credentialing Module can also be used as a repository of reporter contact information. After the show, the module can be used as a tool for evaluating and tabulating show coverage by the media. Accordingly, the Media Credentialing Module also creates a long term view of reporter engagement with the tradeshow community so show organizers can make decisions for subsequent tradeshows based on the coverage at each prior tradeshow. The Media Credentialing Module includes a "Reports" area for gathering, viewing, and tracking such information in a central location. The Media Credentialing Module can also link to publications and other data of analyst firms and organizations stored on the Gateway's Database(s) 116 using Meta Data fields that include, for example, a byline or author information that help facilitate the match and keyword analysis of the module.

The Media Credentialing Module includes functionality for grouping participants into applicant classes and applying different rules for credentialing different applicant classes. For example, TV/Radio applicants might have to submit video or audio samples, whereas bloggers might submit online hyperlinked samples. For each applicant class, the administrator can define the name for the class, the type of specific documentation required, how much of each documentation is required, and the nature of the class type. Each of those identifiers may be based, for example, on whether each applicant is a Reporter/Editor/Journalist/Blogger, Analyst/Consultant, Freelance Journalist, or Broadcast TV/Radio/Internet (Podcast/Webcast).

The user interface of the Media Credentialing Module for participating users provides functionality for a participating user to enter his/her information and upload his/her application. The participating user interface can be provided as a standalone web-based process, integrated with the main Gateway, or intermeshed with the event organizer's website. In all instances, the Media Credentialing workflow administrator can adjust Help text, add FAQs, change the look and feel of the participating user interfaces, and adjust the process settings in order to customize the participating user interface. On entering the participating user interface, the participating user will be asked to log in and to confirm his/her organizational and personal profile information before being presented with the appropriate steps for the corresponding stage of the Media Credentialing process. The participating user interface will present different steps to users at different times during the schedules pertinent to the workflow process, only showing the participating user those screens that are pertinent to that user at that time.

A further example of use of the workflow engine of the present invention with respect to a tradeshow is the Events Relations Module. The Event Relations Module provides key external relationship management for events organizers and internal events coordinators. The Event Relations Module can, for example, be used to coordinate a Call for Papers/Call for Speakers process wherein companies and contacts are invited to submit their ideas for papers and speaker slots at an event. The Events Relations Module provides functionality for users to review submitted ideas, rate and decide upon those ideas, and automatically create an event agenda comprised of the accepted ideas. All suggesting users are notified by the Events Relations Module as to the acceptance or denial of their suggestions in the same way that reporters are alerted via the Media Credentialing Module. The Events Relations Module also provides functionality for users to group ideas by category or to track, create, and export reports showing all accepted ideas. Using such a workflow, a user can easily gather information required for the user's event materials through the workflow of this module. By listing the user's speakers/paper presenters, the user can, in one place, communicate with and download voluminous profile, bio, logo, picture, and other information that the user needs to populate the user's event website and documentation. The Event Relations Module also supports full e-commerce capabilities for accepting credit cards and invoicing users for activity as defined in Preferences by the Gateway account workflow administrator.

The Event Relations Module provides functionality for users to create listings of exhibitors at an event. By listing the user's exhibitors in the Gateway, the user makes it easy to communicate with and gather profile, logo, representative, and other information to drive event directories, website content, and other marketing information. Such a listing can also be referenced by other Gateway modules for access rights and pricing discounts, such as for Awards Module processes where only exhibitors are allowed to enter or where exhibitors are given a 50% discount on the participation fee.

The Gateway can be enhanced to also facilitate the entire process of managing the effort of setting up meetings between the press and executives at tradeshows with the Event Relations Module. The Event Relations Module facilitates all back and forth communications to aid the user in achieving a successful event. And, with the workflow engine, a user can create a customized workflow to facilitate the entire process of managing the effort of, for example, setting up meetings between the press and executives at tradeshows.

In many cases, tradeshows are an ideal location for meetings to take place between tradeshow participants, analysts, and journalists. Scheduling such a meeting can, however, prove to be difficult. Before a tradeshow, it is typical for people to attempt to contact the reporters and editors that are going to the tradeshow to arrange meetings with their executives. It is time consuming and a real challenge, however, to balance everyone's schedules. During the show, there are often changes to schedules that have to be accommodated and, thus, a need to contact those who are scheduled to attend changed meetings. Simple messages and inquires, such as "I'm running late." or "Where is the user's booth, I cannot find it.", can be difficult to communicate effectively.

Accordingly, the Event Relations Module also provides functionality for users to set such meetings up and to have synchronization between the Gateway of the present invention and a meeting participant's calendar programs, e.g., MS OUTLOOK brand calendar program, in order to keep the two in sync for all meeting participants. The Event Relations Module utilizes the Alerts Module to inform people via, for example, SMS, of upcoming meetings and to provide functionality to send information back and forth between the meeting coordinators and meeting participants.

At the earliest stage of the process, tradeshow vendors typically block out a time in which meetings will occur. They then ask journalists en masse if they would like to meet. They may invite a select group first, get them on board, and then invite more to fill vacancies in the schedule. Note that there might be several tracks of meetings to be planned, e.g., they might have three conference rooms in their booth plus a suite, for which to plan meetings. They might also decide to plan meetings around a person or a place, and perhaps both. On the recipient side, industry analysts and other interested parties receive all these requests but really do not have a good way to manage them all. He/she accepts or rejects them and then negotiates a time that he will be available to meet.

The Event Relations Module therefore functions as a "middle man" to help coordinate all of the meeting activities and frequent meeting updates that usually are required. The Event Relations Module provides for the real-time coordination of schedules. Also, the Event Relations Module provides functionality to account for transit time between the meeting places. For example, at some tradeshow locations, it takes as long as 20 minutes or more to walk from one meeting location to another. The Event Relations Module provides functionality for each meeting to have an updateable "profile" which takes into account such things as the meeting location and the expected travel time between meeting locations for particular meeting participants. Because each meeting participant is being "tracked" by the Event Relations Module, the Event Relations Module can send messages to each participant via, for example their PDA, to remind them of the meeting and the suggested time that they should depart from their current meeting location to arrive at the next meeting location on time. Also, the Event Relations Module provides functionality to create a central messaging board with similar information for the convenience of those who do not have a way of receiving such messages remotely.

The Event Relations Module also provides functionality for meeting coordinators and schedulers to put people into groups of prioritization. For example, if an organization really wants to have particular analysts meet with them, those analysts are assigned priority one while other analysts are assigned priority two, etc. The organization may only invite the priority one analysts to a meeting first before inviting the priority two analysts, etc. Often, a specific analyst is not going to the show, but would want another analyst to go in their place, or to schedule a post-show or pre-show briefing via telephone or the Gateway of the present invention. Thus, the Event Relations Module also provides functionality to schedule pre-show and post-show meetings.

A further example of use of the workflow engine of the present invention is the Awards Module. The Awards Module was specifically designed to support event organizers, awards organizers, associations, and publishers who need to have a full end-to-end workflow to support the creation, nomination to, judging, award, and presentation of awards. The Awards Module supports all the e-commerce of the nomination process, supporting online forms and credit card/invoicing interfaces to access a nomination application and application fee. The module supports the communication with potential judges and assignment of judges to categories. It enables award administrators to centrally view the status of nominees, judges, and other key personnel as they interface with the Gateway. The user can use system e-mails or create their own to guide the nominees and judges through the awards process. Single and multi-stage (semi-finalist, finalist, winner) judging processes are supported by the Awards Module. On-line rating forms are provided to enable judges to enter information directly into the Gateway's Database(s) 116 from anywhere in the world at any time. Where goods are being shipped to the judging entity for review, the Awards Module utilizes electronic shipping forms to track the receipt and return of products and services being submitted for judging. The results of the awards process can be loaded onto websites as well as downloaded for use in other systems. Information, such as nominees, categories, judges, process dates, etc., can be auto-published to the user's website, thus providing the user with a content management solution as well as an awards workflow process for transferring information back and forth with those involved in the awards process. The Awards Module provides everyone involved in the awards process with a streamlined, trackable, and reliable interface for all tasks associated with naming winners in awards categories.

The Awards Module also simplifies the process of having sponsors take part in the Awards program. Upon creating a workflow, the Awards Module provides the Awards workflow administrator with an onscreen hyperlink for a participating user interface specialized for sponsors, wherein, after logging in, the sponsor can prepay for awards entry submissions, purchase available sponsor rights, or perform other sponsor duties.

The first step in the awards process is to create the award group within the Awards Module. The award group is defined with a description and various pertinent preferences. If there is just one award, then the award group and award are the same. If not, there may be a number of awards under an overall award group.

The next step is to create the individual awards in the group. This is like creating a schema for a directory with each node representing an award. Judges and nominees will be linked to each award. This creates the judging relationship for each award. There may also be awards that are based on other awards, e.g., "Best in Show" might be a nominee group made up of the winners of all sub-categories and "All of Show" might be a nominee group made up of all participants, regardless of the category in which they are entered, such as "Best Newcomer" or "Most Spirited".

The next step is to enter the contacts for the awards. There are two groups of contacts for each award: Judges and Nominees. The nominees will either go through a formal entry process in the Awards Module, which might or might not have a payment obligation for submission, or be entered into the Awards Module by the award administrator. Nominees may be nominated for one or multiple awards. Judges are invited to be judges and are assigned to their judging categories in one of two ways: they request certain categories by selecting them in order of preference within the Awards Module; or they are put in categories in the Awards Module by the award administrator. Judges must confirm they will participate within the Awards Module. There may be two levels of judges: one level to narrow the nominees down to semifinalists; and one level to vote on the finalists. The Awards Module also provides the award administrator with functionality to view the progress of the awards process at any time via a contacts status page. The administrator may also sort through the awards process information in columned lists. The Awards Module also provides a contacts page that lists the companies and their respective contact type, e.g., judge, nominee, sponsor, for companies participating in the awards process.

The underlying categories for an awards program must be created in the Assignments area of the Awards Module. In the Assignments area, functionality is provided for the workflow administrator to create, edit, and assign award entries; assign judges; and otherwise manage the categories of an awards program. If not enough entrants are in multiple categories, those categories may be merged in the Assignments area. Each category's preferences are managed in the Assignments area.

Where judges and/or nominees must fill out forms in the Awards Module to register, the Surveys Module can be used to create those forms. There may be multiple forms that might be created and associated with each award. The Awards Module also includes process forms for shipping, receiving, and for additional, optional surveys of nominees. There are also specialty forms formatted for small screens (e.g., PDAs, cell phones) for judging when on a show floor or in the outdoors.

The Awards Module provides judges with the ability to designate how they would like to receive the items to be judged where something other than web-based publication is being judged. For example, if the judges are judging software, the software could be sent via electronic download or CD Rom. Some organizations may allow each individual judge to decide whether he/she would like to receive all the documentation. Some organizations may provide instructions for how to open an account to access the item to be judged. Thus, once the awards process has begun, the parties whose products or services are being judged will be asked to register with the Gateway and to fill out a form in the Awards Module that specifies how each party wishes to make its product available for judging. Likely, organizations will request a meeting and suggest some times to meet. This time could be agreed upon and the judge can have an online representation of his scheduled meetings via the Awards Module. The main interface of communications over the Awards Module is e-mail. The workflow administrator has the ability to hide all identifying fields from a nomination to allow for "blind judging" in which the judge makes a determination about an entry based solely on the shown fields. For example, a small studio art quilt association might want the judges to not know who submitted an image for judging due to friendships that might affect judging. With such blind judging, all the judges see is the picture of the quilt with the score questions below.

The Awards Module supports a number of specialized communications processes in the course of affecting the workflow. Should a judge encounter an issue with judging a particular nomination, the judge can submit a problem report that initiates a process wherein all the other judges are sent communications asking them to review the nomination with the judge's complaint in mind, and to decide if the nomination needs to be moved or disqualified. After all the judges have voted, the workflow administrator decides what to do, and has an array of supporting options that all involve automatic communications with the judges and the affected nominee.

Another example of a specialized process provided within the Awards Module is the ability to automatically handle late entrants. Users who try to join an awards process after the deadline can request an extension and, depending on the workflow's Preferences settings, get an automatic 24-hour extension or get a form to send an e-mail requesting an extension. The Awards Module will then send the workflow administrator a communication to this effect and the workflow administrator can enter a simple process for letting the late entrant have an extension or denying the late entry.

Yet another example of a specialized process provided within the Awards Module is the ability to make available for downloading the images of the Winner, e.g., a Winner's Logo to go on a website, and to apply e-commerce to that process, e.g., if there are additional fees for downloading the logos. The participating user interfaces are outfitted with a step that only appears at the right time (post-announcement of winners), to the right people (winners), and shows the right logos pertinent to the right participants (the Audio logo to the winner of the Audio Category).

And another example of a specialized process within the Awards Module is the ability to manage the signing up for, and distribution of, speaking slots to winners. Often, the winners of awards programs are allowed speaking slots at a conference or awards banquet. Such speaking slots entail an entire process of assigning speaking slots to nominees. Accordingly, the Awards Module automates the assigning process by prompting winners to re-enter the participating user interface to select among available speaking slots on-stage. When done, that user receives a confirmation e-mail and onscreen notice via the Gateway. When all of the speaking slots are filled, the workflow administrator is provided with a listing of speaking slots and who's speaking, including each speaker's contact information.

The Member Relations Module provides association, forum, and other member-driven organizations with functionality to gather and maintain information from their membership. Items like logos, organization information, bios, tradeshow representatives, PR representatives, and other organization-specific pieces of information are very time-consuming for membership managers to track. The Member Relations Module provides a streamlined workflow that is integrated throughout the Gateway to pull out specific roles and responsibilities and push/pull corporate data to/from membership organizations that need/have that data. Associations and forums can set up classification systems and other data gathering structures in the Gateway and receive that information in the form of pre-formatted HTML, XML streams, text data, or any of a number of other formats to drive their own systems and processes. The Member Relations Module solves the problems of organizations that need to gather data and organizations that want to control the positioning of that data.

The Member Relations Module also provides functionality for workflow administrators to maintain a listing of all of an organization's members, including each member's membership level in the organization. That listing can also be maintained by direct feeds into the Gateway from an organization's membership registration system databases. By listing the organization's members in the Gateway, the organization makes it easy to communicate with and gather profile, logo, representative, and other information to drive association directories, website content, and other marketing information. That listing can also be referenced by other Gateway modules for access rights and pricing discounts, such as for awards processes where only organization members are allowed to enter or where members are given a 50% discount on the participation fee.

The Legal Relations Module provides organizations with an end-to-end means to manage the process of entering into, storing, and updating marketing-related legal agreements, such as Non-Disclosure Agreements (NDAs). NDAs are routine in marketing discussions. However, the process of tracking which agreements are in place, when they expire, who signed them, etc., is anything but routine in most organizations. For the most part, NDAs are signed, filed, and forgotten about until they are referenced for a legal reason. But, by then, it is often too late to do anything about any problems within the agreement itself. Accordingly, the Legal Relations Module provides the user with an infrastructure to track all the user's outstanding NDAs and other legal documents and provides a mechanism for updating these agreements when they expire or when the user needs to insert new content. As organizations, personnel, and processes change, it is easy for required changes and updates to go undone, yet it is very important in protecting the legal interests of the user's organization to make such changes and updates. Accordingly, the Legal Relations Module provides a central access point for multi-user workflows that can include all the necessary parties for executing such agreements. With the addition of electronic signatures, those on-line documents can, in many cases, replace the popular fax machine in executing such documents.

The Legal Relations Module also provides functionality for organizations to upload documents with embedded variables that enable a workflow administrator to establish simple forms to drive information into complex documents and to initiate a review and approval process for that document. The Preference Area enables users to designate defaults for key variables, such as length of term, expiration date, and internal signatory contact. Executed documents are sent to all signing parties (more than two parties can sign an agreement).

The Prospects Module is a sales tracking module that provides functionality for marketers to research customer databases from within the Gateway and then action against those databases with marketing and sales campaigns. Designed to complement sales tools available in the prior art, the Prospects Module helps track Gateway-specific customer data so that the user can initiate sales and marketing activities based around actual actions within the Gateway's processes. For example, all new participants in a Buyer's Guide workflow might receive an email prompting them to sign up for the organization's Directory workflow. New prospects and existing customers can be loaded into the module to facilitate all forms of research and campaigns. Prospect lists can be accessed by the various other Gateway modules so the user can invite customers to join the user's classification system or send surveys to them. What differentiates the Prospects Module from other customer relationship management (CRM) products on the market is the integration deep in the Gateway's processes.

The Market Presence Module provides functionality for an organization to analyze its current corporate and/or product positioning, i.e., their "presence", on the web. The Market Presence Module draws information from many different areas of the Gateway, including saved searches, retrievers, and organization directories. The Market Presence Module consolidates all of the information in the system into a dashboard-driven, user configurable view of market presence. Examples of this functionality include incorrect or inconsistent representations of the organization's information, executives, and products; lack of representation on websites where the organization's competition is listed; and lack of accuracy in representing merged, acquired, or renamed organizations. The Market Presence Module uses the Gateway's sophisticated retriever engine to analyze key indicators of the organization's market presence, from the number of articles found in various sites to the comparative listings in directories and membership listings in associations and forums. The Market Presence Module gives the user a summary of the user's success and failures in maintaining the user's information across the Internet. The Market Presence Module enables comparisons to direct competitors and analysis based on specific publications/analyst firms/other organizations, specific analysts or reporters, or specific roles. For example, within the Market Presence Module, a user can view which reporters wrote the most about the user's competitors relative to the user's own firm.

The Buyer's Guides Module provides research functionality that covers the end-to-end process for gathering a large amount of discrete information from many information sources. The module supports the process for getting information in from those sources as well as the entire testing and review process for organizations that receive product or services for testing, and need to rate those products. The module enables tracking of each participant through the process and stores the entire communications history between the user and participant. As with all workflows, the communications history records whether or not the system has determined if an e-mail has been received by the destination e-mail server and if that server has indicated that the user has opened the e-mail.

Acquisitions surveys enable the user to gather initial data about each product from the vendors should the administrator wish to pre-screen all entrants and deny access to those deemed not worthy of taking part. Preview comments surveys help the administrator gather initial comments on the proposed feature survey to be issued, before it is actually issued. Feature surveys help the administrator gather and confirm detailed product level information. Electronic shipping forms enable the administrator to electronically track receipt and shipping of items. Rating forms allow an organization's internal and external testers to log in and record results. Data can be auto-published to matrices and tables on websites, or downloaded in XML and other formats. Electronic survey creation tools provided in the Buyer's Guides Module enable the administrator to create and edit the forms into which data is entered and validated. A wide variety of question types, including phone, URL, date, rating, and table listing are available. The Buyer's Guides can be left "open" to allow for ongoing data updating by users who have been given access to the Buyer's Guide. The Buyer's Guides Module provides an end-to-end workflow that can reduce the time required for custom product research down from weeks and months to just days. As with other workflows, e-commerce can be supported throughout the process.

The Buyer's Guide workflow process can interlink with an organization's central product repository in the Products Module of the Gateway. When a user goes to enter a new product, the user is queried whether he/she wishes to build a new product record from scratch or to build it from an existing product already in the Gateway's Database(s) 116. Similarly, when the user saves changes to a product form, the user is queried whether he/she wishes to make the same changes in the central product repository. This functionality helps a user make use of an existing wealth of information in the Gateway, which makes the task of responding to Buyer's Guides more efficient. The Buyer's Guide workflow process supports collecting data about people, companies, products and more. Uploaded information can be categorized against a directory associated with the specific Buyer's Guide workflow.

The Surveys Module provides users with an electronic survey tool that is designed for one-time and scheduled repetitive surveying of, for example, customers, vendors and service providers. A broad range of question types enables a user to very specifically gather and validate data for the user's research needs. For example, the user can access listings of organizations and individuals from within the user's My Contacts Module, by linking to specific groupings of organizations based on the user's classifications, or by importing the user's own contact lists. The user can track all communications with the user's research targets and know who has completed surveys and who has not. The user can search the user's communications history in the Messaging Module to make sure e-mails were sent to all of the research targets. The user can use system generated e-mails, or create the user's own. The user can publish results to the user's website or download them via a list of output options. The Surveys Module tightly integrates with the Gateway's other modules to give the user a very powerful on-line research tool that can continually produce results for the user's organization.

The Survey Module also provides functionality to perform repetitive surveys of the same population group on a regular basis. For example, a publication's workflow administrator can query 100 top decision-makers about their confidence in the industry, once a month, and automatically track this graphically from month to month. Each month, the survey tool can send out e-mail requests for the 100 decision-makers to respond to with their scores for confidence, and then tabulate the responses and auto-publish the results to the publication's website using the Presentations Module and External Hosts Module. Decision-makers who fall off in their responses can be sent different e-mails from those who regularly participate and the workflow administrator can get a report on participation and results after each cycle.

The Gateway Directories Module provides functionality for a user to create and maintain a hierarchical categorization system to segregate and structure Gateway content with greater ease. The Gateway Directories Module is preferably used to create directories of content in the Gateway that are categorized around some schema. Thus, white papers might be uploaded into a white paper listing site with sections by topic, and organization profiles might be uploaded to a directory of companies. Using the Gateway Directories Module, a user can organize how his/her own Gateway content as well as other Gateway content is presented by the Gateway to that user based on the hierarchical categorization of different types of data. Accordingly, the Gateway Directories Module enables the user to create the user's own unique, prioritized view of the user's world as presented to the user by the Gateway at the Presentation Layer 206. And, by classifying the user's own content based on the type of data, the Gateway Directories Module also enables the user to control how that user's content is presented to other users throughout the Gateway. For example, if the user creates lists of organizations for presentation on the user's Gateway based on those organizations' segment in an industry, organizations will be added or deleted from those lists automatically as the organizations join or leave each listed segment of industry. And, in conjunction with the Alerts Module, the Gateway Directories Module can also send alerts to the user of such changes and even send alerts to the organizations when those organizations are added or deleted from users' lists.

The Gateway Directories Module also provides functionality for users to create nodes within each directory to establish Preferences, such as the type of content being collected in that directory and what eligible data can be entered at each node, e.g., only events organizers can list themselves in the event organizer node. Preferences for e-commerce fees are also established by the workflow administrator. As with the Buyer's Guide workflow process, as users create new content in the directory, they are prompted if they want to upload/update their central content repository. And, when creating a new entry, users have the option of linking to existing content and applying it to the workflow so that subsequent changes to the central content repository will flow through to those records.

The User Tasks Module provides users with functionality to track tasks that a user is responsible for completing. The User Tasks Module provides functionality to create, assign and track tasks from within the Gateway. In conjunction with the Notifications Module, the User Tasks Module can provide users with notifications as tasks become due. Users can also use the User Tasks Module to set up their own "Tasks Groups" and add team members into the group that will also receive notifications as tasks become due.

The Challenge/Response Module provides functionality for users to participate in an ongoing, stored onscreen discussion or to describe information displayed by a user in more detail. Using the Challenge/Response Module, users can engage in an onscreen discussion, or chat, whereby the contents of that discussion are stored and displayed on the Gateway so that other users can read and participate in that discussion on an ongoing basis. Or, an organization might add an additional layer of information to information displayed on the Gateway, such as by adding the comment "This feature will be available in Spring 2010" to a cell of information that says "Not Available". The Challenge/Response Module overlays the workflow engine and is appropriate to workflows with publicly displayed information that have the potential to be debated, such as product specifications in a Buyer's Guide or organization profile statistics in a directory.

Suggestions Section

The Suggestions Section of the Gateway provides users with a means to interact with the Gateway Provider and with other Gateway users to provide feedback and recommendations regarding the Gateway. A user can suggest that Sellers or Influencers be added to the Gateway, report bugs and feature ideas, and invite other people to join the user in the Gateway. The Suggestions Section's functionality is integrated throughout the Gateway, showing up in context where suggestions and invitations are most often used. The modules that provide such functionality include an Invitations Module, a Suggest-A-Seller Module, a Suggest-An-Influencer Module, a Suggest-A-Feature Module, a Suggest Content Module, a Report-A-Bug Module, a Report-A-Database Problem Module, and a Recommend-The-Toolbar Module.

The Invitations Module provides functionality for a user to easily invite a partner, employee, contractor or anyone else to log in and become part of the user's Gateway experience. For example, PR firms can use the functionality to get clients to register for the first time. And, influencers can use the functionality to alert PR representatives that they should join the Gateway. The Invitations Module also provides functionality for the user to enter the user's own personalized message to invitees and provides a preformatted set of instructions generated by the Gateway's messaging engine for invitees to use to register with the Gateway. The Invitations Module will then cause the notifications engine to send an e-mail message to the invitee listed. Accordingly, the Invitations Module provides an easy, systematic way to get other people into the Gateway that the user needs to complete tasks within the Gateway.

The Suggest-A-Seller Module provides functionality for a user to suggest that a Seller be added to the Gateway. Upon filling in the relevant information, the Suggest-A-Seller Module causes that information to be sent to the Gateway's import/export engine, where the Seller's name and URL are evaluated relative to existing records on the Gateway's Database(s) 116 and updated/added accordingly, with manual review by the Gateway's processing representatives if necessary. Once added to the Gateway's Database(s) 116, the user is notified that the record is ready to be utilized in completing the user's task. Such functionality can be used, for example, by Influencers who wish to include a Seller within a body of research and find that the Seller is not yet using the Gateway. And, after the relevant information has been uploaded to the Gateway's Database(s) 116, the Seller is given the opportunity to update that information when the Seller registers with the Gateway. If the Seller is already registered with the Gateway, the Seller will be given the opportunity to update that information the next time one of the Seller's authorized representatives logs onto the Gateway. A Suggest-An-Influencer module provides substantially identical functionality for suggesting that certain Influencers be added to the Gateway.

The Suggest-A-Feature Module provides functionality for users to request that of certain features/functionality be added to enhance the Gateway. The architecture of the Gateway is sufficiently flexible that it can be easily changed as necessary to respond to such user requests. Accordingly, the Gateway may be driven by user-suggested improvements. Suggested features are entered as Tasks in the Gateway Tasks Module for consideration by the Gateway's marketing and development personnel.

The Suggest Content Module provides functionality for users to request that certain content be added to the Gateway's Database(s) 116 so that the information may be linked by other users to those users' websites or myGateway desktop environments. The Gateway's spider engine can be programmed by Gateway Provider Administrators to retrieve and track substantially any data a user requests. For example, an event organizer can suggest that his/her event be added to the Gateway's Database(s) 116 and tracked by the spider engine.

The Suggest Content Module provides functionality for users to request that certain content be added to the Gateway's Database(s) 116 so that the information may be linked by other users to those users' websites or myGateway desktop environments. The Gateway's spider engine can be programmed by Gateway Provider Administrators to retrieve and track substantially any data a user requests. For example, an event organizer can suggest that his/her event be added to the Gateway's Database(s) 116 and tracked by the spider engine.

The Report-A-Database Problem Module provides functionality for users to report duplicate listings in the Gateway's Database(s) 116 not resolved by other modules in the Suggestions Section. The Report-A-Database Problem Module also provides functionality for users to identify any other problems with the Gateway's Database(s) 116. Accordingly, Report-A-Database Problem Module serves as a catch-all for problems that are not handled in the other modules in the Suggestions Section.

The Recommend-The-Toolbar Module provides functionality for users to easily invite someone else to download the Internet Explorer Gateway Toolbar Module, which is described in more detail below. To recommend that a party install the toolbar with the Recommend-The-Toolbar Module, users merely enter the name and e-mail address of the invitee and the Gateway's messaging engine and notifications engine generate and send, respectively, a preformatted e-mail to the invitee to recommend that the invitee install the toolbar. Such preformatted e-mails are defined by a Gateway Provider Administrator within the messaging engine. The Recommend-The-Toolbar also provides functionality for a user to add a personalized message to the e-mail if the user wishes.

Setup Section

The Setup Section of the Gateway enables users to personalize their experience within the Gateway by setting personal preferences. For example, users can set up their own ID and password, manage their notifications, and determine what information is displayed about the user throughout the Gateway. The modules that provide such functionality include a Personal Profiles Module, a User ID/Password Module, a Notifications/Alerts Preferences Module, a Responders Module, a Synchronizations Module, a Tools Preferences Module, and an Identities Module. Preferences can also be set for individual Gateway modules in "Preference Areas" within those modules.

The Personal Profiles Module provides functionality for each user to customize the information they wish to release publicly, and in various specific instances. People tend to have different information they are willing to share with others. Much personal information is kept private and confidential, e.g. as cell phone numbers or home phone numbers. For PR departments, however, giving out certain personal information is routinely expected in their deadline-oriented environment. Such information includes key contact information, bios, communications preferences, addresses, and even pictures of the person. Using the Personal Profiles Module, a user can establish their Private Profile (used by the Gateway Provider and customer support to communicate with the user), Public Profile (generally viewed by any user of the Gateway), and Media Profile (specific to Influencers and used by media information distribution companies to educate media relations groups about how to contact the user). Accordingly, the Personal Profiles Module provides users with better control over what personal information is disseminated and to who it is disseminated.

The User ID/Password Module provides functionality for a user to manage his/her own login information after the user registers on the Gateway. Validation functionality, which must be employed if the user loses his/her user ID or password, is also provided in the User ID/Password Module.

The Notifications/Alerts Preferences Module provides functionality for a user to set his/her preferences as to what notifications and alerts he/she receives from the Notifications Module and the Alerts Module, respectively. The Notifications/Alerts Preferences Module also provides functionality for a user to set his/her preference as to what means are used to send specific notifications and alerts. For example, a user can input an e-mail address for a specific notification if he/she desires to receive that notification by e-mail. Or, a user can put in the telephone number of a cell phone to receive an alert or notification by SMS.

The Responders Module provides functionality for users to create auto-responses for inbound e-mails to the user's Gateway e-mail account in special situations. For example, if a user is going to attend a Consumer Electronics Show (CES), the user can create an e-mail address in the user's Gateway e-mail account called CES@Gateway.net. And, when the user subsequently receives an e-mail from a press person wanting to set up a meeting at the CES, the user can forward that e-mail to the CES@Gateway.net address and have it return an e-mail to the press person with further instructions as to how to set up meetings with the user. The Responders Module includes functionality to determine the appropriate person(s) to send the return e-mail to based on the forwarded e-mail. The user can also use the Responders Module to tell people to take the user off their e-mail lists or that the user's e-mail address has changed.

The Synchronizations Module provides functionality for a user to synchronize data flow back and forth between users and the Gateway. For example, using the Synchronizations Module, a user can synchronize information on the Gateway to be automatically sent to his/her PDA, cell phone, Computer-based Calendar, Electronic Notes, and other electronic databases on a regular basis, ensuring that the information the user is relying on from the Gateway is always the most up-to-date The Tools Preferences Module provides functionality for a user to set his/her preferences for each of the Gateway's tools provided in the Tools Section. The Tools Preferences Module therefore provides a central access point for configuring and storing preferences for each of the Gateway's tools, such as the Gateway Internet Explorer Toolbar Module.

The User Types Module provides functionality for a user to maintain the user's Type setting in the system that governs the configuration of the system.

The Setup Identities Module provides functionality for a user to control his/her requests to gain access to other organizations' accounts and to manage their present listing of Identities. Requests for access to other accounts is governed by the Administration's Access/Security Module and are approved/denied by each organization's administrator.

Tools Section

The Tools Section of Gateway provides users with software programs that support the Gateway process in a number of ways, whether providing add-ins for MS brand products, or browser and synchronization support capabilities. Because the bulk of the Gateway functionalities are provided with web browser-based capability, helper applications on the devices used to access the Internet, such as Computer Work Stations 104, can be used to provide more enhanced Gateway capabilities where the web browser does not have that capability. Those helper applications, or tools, are designed to more directly facilitate users' Gateway experiences and make those experiences as efficient and context sensitive as possible. The modules that provide such functionality include an Office Images Add-In Module, an Office Hyperlinks Add-In Module, an Office Dictionary Add-In Module, an Office Gateway Files Add-In Tool, an Internet Explorer Gateway Toolbar Module, and a Web Conferencing Module.

The Office Images Add-In Module provides users with direct access in the MS OFFICE brand software suite to Gateway image content. Users can, with one mouse click, add a logo or icon to their MS OFFICE brand software applications, such as an MS WORD brand document, an MS POWERPOINT brand presentation, or an MS EXCEL brand worksheet. Upon launching the module from within an MS application, the user logs into the Gateway and then enters the relevant search text, then the Gateway will return the results of the search and the user can click on the desired image and it will be added to the MS application file in use on the screen.

The Office Hyperlinks Add-In Module provides users with direct access in the MS OFFICE brand software suite to Gateway hyperlink content. Users can, with one mouse click, add an organization name and URL to their MS OFFICE brand software applications. The Hyperlinks Add-In Module works fundamentally the same as the Images Add-In Module.

The Office Dictionary Add-In Module synchronizes the Gateway with a custom dictionary within the MS OFFICE brand software suite to ensure sure that product names, corporate names, executive names, etc., are spelled correctly within the Gateway using the MS spell checking tools. The custom dictionary is merely one of several dictionaries the MS OFFICE brand software suite checks as the user creates the documents. This functionality ensures reliability of references within all of the user's documents. Accordingly, the Office Dictionary Add-In Module provides a simple, yet automatic benefit from an organization's use of the Gateway service that was not previously available.

The Office Gateway Files Add-In Module provides functionality for users to upload and download documents to and from the MS OFFICE brand software suite to make uploading a new white paper or press release as easy as entering a "Save" command in one of the application of the software suite. The Office Gateway Files Add-In Module provides a shortcut directly into the Gateway's Database(s) 116 for those purposes.

The Internet Explorer Gateway Toolbar Module combines many of the capabilities of the Gateway search functionalities with many other search engines, such as GOOGLE, YAHOO, AMAZON.COM, EBAY, and WEATHER.COM brand search engines. By combining all of the capabilities of those search engines, the Internet Explorer Gateway Toolbar Module provides a single powerful toolbar in the browser window of the device that the user is using to access the Internet, such as a Computer Work Station 104. Accordingly, the Internet Explorer Gateway Toolbar Module provides functionality for users to directly search for the same topic across many search engines simultaneously on numerous databases and websites. Users can also quickly find the weather, directions to a location, stock quotes, word spellings, etc., through the capabilities of the Internet Explorer Gateway Toolbar Module. In addition, the Internet Explorer Gateway Toolbar Module includes a Notification Alert Button on the toolbar that alerts users of the users' tasks that are pending in the Gateway. There are customizable buttons in the toolbar and the toolbar can be privately branded by Influencers for their customer base. The Internet Explorer Gateway Toolbar Module thereby consolidates the users' most important Gateway research and notifications capabilities in one place, and can be a strategic feature for any user. Management of a privately branded toolbar by a Gateway Account Administrator is performed in the Administration Section's Toolbar Management Module.

myGateway Section

The myGateway Section is a customized work environment that gives the user a visual overview of all of that user's associated tasks, notifications, requests, projects, and other system functions, in one central location. Information is presented to each user in customized widgets so that only that information pertinent to that user is displayed. For example, users who do not have authorization to access a specific Buyer's Guide publication simply would not see that specific publication in their Buyer's Guide Widget.

The Gateway Desktop is the main page of the myGateway Section and provides functionality for automatically generating task listings for users, widgets for summarizing and accessing each major function in the Gateway, including the functionality of the Buyer's Guides, Classifications, Search, Retrievers, Surveys, and Messaging Modules, Identities functionality, and help functionality. In the Gateway Desktop, functionality is provided for each individual user to add, remove, or minimize widgets to customize the look of their personal Gateway Desktop. The Gateway Desktop provides each user with a dynamic environment that automatically updates and changes all of the data a user wishes to track, such as daily tasks, current editorial relationships, current editorial requests, present projects, system requirements, subscriber level, and other key activities. Accordingly the Gateway Desktop provides a user interface where a user does all of his/her marketing work each day in one concentrated, prompted environment space. The widgets that provide such functionality include a Tasks Widget, a Buyer's Guide Widget, an Awards Widget, a Buyer's Guide Administration Widget, an Awards Administration Widget, a Surveys Widget, a Directories Widget, a Retrievers Widget, and Events Widget, an Editorial Opportunities Widget, a Messaging Widget, a Search Widget, a Saved Search Widget, and a System Changes Widget.

The Tasks Widget provides a customized listing of actionable hyperlinks, i.e., "On the Desktop" notifications, that, when clicked upon, take the user to the place where the activity must take place. For example, if a user has not entered a logo for his/her organization, a notification would appear in the user's Tasks Widget prompting the user to enter a logo. If the user then clicked on the notification, the Gateway would take the user to the Organization Logos Module where the logo could be uploaded. The Tasks Widget is the user's virtual to-do list each day, and will ensure that the user organization's web presence is maximized.

The Buyer's Guide Widget provides a listing of those Buyer's Guide processes in which the user is participating, i.e., those Buyer's Guides the user is responding to, and those Buyer's Guides in the user's area of interest that are open to all Gateway users. Different publications and analyst firms use different terms for the content of their product comparisons: Buyer's Guides, Roundups, Comparative Matrices, Summary Analyses, etc. Regardless of the terms used, the Buyer's Guide Widget provides functionality to gather all of the relevant information from those product comparisons in which the user is participating and provide it in an overview list format customized to each user's participation or area of interest. The overview list is provided with hyperlinks that a user can click to directly access each of the user's associated Buyer's Guide records. The Awards Widget provides substantially the same functionality for an awards process.

The Buyer's Guide Administration Widget provides functionality for the a user who is managing Buyer's Guides for an organization to gather all of the relevant information from those product comparisons the user is managing and provide it in an overview list format in the same manner as the Buyer's Guide Widget. The Buyer's Guide Administration Widget also provides functionality for the user will be view the present aggregated status of each participant in Buyer's Guide process that user is managing, from "Invited" to "Completed Buyer's Guide". The Awards Administration Widget provides substantially the same functionality for managing an awards process.

The Surveys Widget is a listing of the surveys the user is managing, those surveys the user is responding to, and/or those surveys that are open to all Gateway users and in the user's area of interest, i.e., those in which the user may consider taking part. The Surveys Widget shows the user, in an overview format, the user's present status with each of the listed survey processes, and provides the user with hyperlinks directly into each of the survey records. If the user is managing the survey, the user will be shown the present status in his or her survey, from "Invited" to "Completed Survey".

The Directories Widget is a listing of the classifications that the user has not yet identified the user's organization with or classifications that need attention, either because they have new nodes in their classification system or because the user has not checked it for a while to make sure it is still current. The Directories Widget provides functionality for the user to click straight through to the listed classifications system.

The Retrievers Widget provides the user with the status of all the user's information retrieving tasks being carried out by the Gateway's retriever engine, whether the user is searching for books, white papers, events, articles, press releases, webinars, or any of the many information types the Gateway supports. Users can click directly through to the listed retriever to process records.

The Events Widget gives users insight into upcoming events in their area of interest and action items for upcoming events, such as speaker information due or presentation materials required. The user can see events that he/she might want to consider attending, exhibiting at, speaking at, sponsoring, or otherwise becoming involved with. The user can click straight through to the event to take the action listed or to review information pertinent to the event.

The Editorial Opportunities Widget provides summarizes for the user of upcoming editorial opportunities that the user should be aware of, whether it is the opportunity to take part in an article or to submit editorial content. The Editorial Opportunities Widget lists the publication and due date for editorial opportunities, and those listings are hyperlinked to their corresponding more detailed information within that publication's editorial calendar listing. Also listed are ad hoc reporter inquiries from editors looking for sources, story ideas, case studies, or other editorial input.

The Messages Widget is the user's Gateway inbox for the user's Gateway e-mail account. In the inbox, the user can review any messages waiting in their inbox.

The Search Widget is the user's central access point into the Gateway's powerful search capabilities. In the Search Widget, users are provided with an open text box and a list of the various search applications accessible through the Gateway.

The Saved Search Widget provides functionality to update a user with the status of all his/her information retrievers, such as those set up with the Search (Saved Search) Module, whether he/she is searching for books, white papers, events, articles, press releases, webinars, or any of the many retriever types the Gateway supports. The Saved Search Widget provides an itemized list of the user's Saved Search queries, each of which the user can simply click on to process the found data into his/her databases.

The System Changes Widget provides functionality to alert users that the Gateway has undergone a recent upgrade of which users should be aware. The System Changes Widget provides a list of hyperlinks that users can click on, by module, to see more detailed descriptions of the new functionality.

Support Section

The Support Section of the Gateway is where FAQs, troubleshooting tips, downloads, and other typical support-style functionality is provided. The exemplary Modules described herein are designed around intuitive process flows in the way marketing and research typically is done. However, it is not possible to anticipate every instance. Accordingly, the Support Section includes a Gateway Support FAQ Module, an E-mail Test Module, and a System Changes Module.

The Gateway Support FAQ Module provides functionality for users to obtain online help via online FAQs and online chat session for each module and widget on the Gateway.

The Gateway Support FAQ Module provides the user with access to the answers to the most often asked Gateway-related questions of users.

The E-mail Test Module includes e-mail test functionality that is designed to test the user's e-mail accesses throughout the Gateway. In light of the growing use of multiple layers of SPAM protection in many organizations, it can be difficult to determine whether messages are getting through to their intended recipients. With the Gateway e-mail test capability, the user can send and track a test e-mail throughout the Gateway.

The System Changes module provides functionality for users to track the most recent changes to the Gateway's functionality. Because the architecture and functionality of the Gateway allow the Gateway to be constantly improved and new features to be added, the System Changes updates users of any new functionality within each new software load to the Gateway. This module is most frequently accessed via the Recent System Changes Widget.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A non-transitory processor-readable medium storing code representing instructions to be executed by a processor, the code comprising code to cause the processor to:
   receive, from a compute device of an organization, at a first time, and via an Internet, content (1) stored within the Internet, (2) associated with the organization, and (3) assigned to a product or service from a plurality of products or services;
   receive, from the compute device of the organization, at a second time after the first time, and via the Internet, updated content associated with the organization and assigned to the product or service from the plurality of products or services;
   identify, in response to receiving the updated content, a plurality of parties assigned to receive via the Internet the updated content associated with the organization and associated with the product or service, the plurality of parties being assigned prior to the second time to receive the updated content; and
   send, to a compute device of each party from the plurality of parties, after the second time, via the Internet, and in response to identifying the plurality of parties, a signal representing the updated content such that a website of each party from the plurality of parties is updated automatically based on the updated content, the updated content not being defined by any compute device of any party from the plurality of parties.

2. The non-transitory processor-readable medium of claim 1, wherein the updated content includes at least one of updated product information or updated logo information, the at least one product information or logo information being authored by the organization.

3. The non-transitory processor-readable medium of claim 1, wherein the plurality of parties are a plurality of third parties outside of the organization.

4. The non-transitory processor-readable medium of claim 1, the code further comprising code to cause the processor to:
identify content (1) published within the Internet by a party, and (2) associated with the organization, to produce identified content;
compare the identified content to the updated content to detect outdated content within the identified content to produce an update identifier;
send, to a compute device of the party who published the content, a signal representing the update identifier.

5. The non-transitory processor-readable medium of claim 1, wherein the code to cause the processor to send includes code to cause the processor to send the signal representing the updated content without receiving a request for the updated content from a compute device of any party from the plurality of parties.

6. The non-transitory processor-readable medium of claim 1, wherein the plurality of parties are assigned prior to the first time to receive the updated content.

7. The non-transitory processor-readable medium of claim 1, the code further comprising code to cause the processor to:
receive via the Internet and from the compute device of the organization an instruction to assign the plurality of parties to receive the updated content.

8. The non-transitory processor-readable medium of claim 1, the code further comprising code to cause the processor to:
provide access within the Internet to the updated content via an application programming interface (API).

9. The non-transitory processor-readable medium of claim 1, wherein at least one of the content or the updated content includes hypertext markup language (HTML).

10. A non-transitory processor-readable medium storing code representing instructions to be executed by a processor, the code comprising code to cause the processor to:
receive, from a compute device of an organization, at a first time, and via an Internet, an instruction to assign a plurality of parties to receive updated content (1) associated with the organization, and (2) assigned to a product or service from a plurality of products or services, the plurality of parties being a plurality of third parties outside of the organization;
receive, from the compute device of the organization, at a second time after the first time, and via the Internet, the updated content; and
send, to a compute device of each party from the plurality of parties, after the second time, via the Internet, and in response to identifying the plurality of parties, a signal representing the updated content such that a website of each party from the plurality of parties is updated automatically based on the updated content, the updated content not being defined by any compute device of any party from the plurality of parties.

11. The non-transitory processor-readable medium of claim 10, wherein the updated content includes at least one of updated product information or updated logo information, the at least one product information or logo information being authored by the organization.

12. The non-transitory processor-readable medium of claim 10, the code further comprising code to cause the processor to:
identify content (1) published within the Internet by a party, (2) associated with the organization, to produce identified content;
compare the identified content to the updated content to detect outdated content within the identified content to produce an update identifier;
send, via the Internet and to a compute device of the party who published the content identified to produce identified content based on the update identifier, a signal representing the update identifier.

13. The non-transitory processor-readable medium of claim 10, wherein the code to cause the processor to send includes code to cause the processor to send the signal representing the updated content without receiving a request for the updated content from a compute device of any party from the plurality of parties.

14. The non-transitory processor-readable medium of claim 10, the code further comprising code to cause the processor to:
provide access within the Internet to the updated content via an application programming interface (API).

15. The non-transitory processor-readable medium of claim 10, wherein the updated content includes hypertext markup language (HTML) code.

16. A non-transitory processor-readable medium storing code representing instructions to be executed by a processor, the code comprising code to cause the processor to:
receive, from a compute device of an organization and via an Internet updated content associated with the organization and assigned to a product or service from a plurality of products or services;
identify content (1) published within the Internet by a party and (2) associated with the organization, to produce identified content;
compare the identified content to the updated content to detect outdated content within the identified content to produce an update identifier; and
based on the update identifier and without receiving a request from the party for the updated content, send to a compute device of the party and via the Internet a signal representing the updated content.

17. The non-transitory processor-readable medium of claim 16, wherein:
the content published by the party is published at a website of the party, the party is a third party outside of the organization.

18. The non-transitory processor-readable medium of claim 16, wherein the party is a first party, the identified content is first identified content, the outdated content is first outdated content, the update identifier is a first update identifier, the code further comprising code to cause the processor to:
identify content (1) published by a second party within the Internet and (2) associated with organization, to produce second identified content; and
compare the second identified content to the updated content to detect an absence of second outdated content to produce a second update identifier,
the code to cause the processor to send the signal representing the updated content to the first party includes code to cause the processor to not send the signal representing the updated content to the second party based on the second update identifier.

19. A non-transitory processor-readable medium storing code representing instructions to be executed by a processor, the code comprising code to cause the processor to:
receive, from a compute device of an organization, at a first time, and via an Internet, content associated with the organization and assigned to a product or service from a plurality of products or services;

receive, from the compute device of the organization, at a second time after the first time, and via the Internet, updated content associated with the organization and assigned to the product or service from the plurality of products or services;

identify, in response to receiving the updated content, a plurality of parties assigned to receive the updated content associated with the organization and associated with the product or service, the plurality of parties being assigned prior to the second time to receive the updated content; and send, to a compute device of a party from the plurality of parties, after the second time, via the Internet, and based on identifying the plurality of parties, a signal representing the updated content such that a website of the party is updated based on the updated content, the updated content not being defined by the compute device of the party.

20. The non-transitory processor-readable medium of claim 19, wherein the code to cause the processor to send the signal representing the updated content includes code to cause the processor to send the signal based on both identifying the plurality of parties and receiving a request from the party for the updated content.

21. The non-transitory processor-readable medium of claim 19, wherein the updated content includes at least one of updated product information or updated logo information, the at least one product information or logo information being authored by the organization.

22. The non-transitory processor-readable medium of claim 19, wherein the plurality of parties are a plurality of third parties outside of the organization.

23. The non-transitory processor-readable medium of claim 19, the code further comprising code to cause the processor to:

provide access within the Internet to the updated content via an application programming interface (API).

24. The non-transitory processor-readable medium of claim 19, wherein at least one of the content or the updated content includes hypertext markup language (HTML) code.

* * * * *